US012688163B1

(12) United States Patent
Kumar et al.

(10) Patent No.: US 12,688,163 B1
(45) Date of Patent: Jul. 21, 2026

(54) AI-DRIVEN DYNAMIC DATA EXCLUSION ENGINE FOR EFFICIENT CLOUD TIERING IN STORAGE SYSTEMS

(71) Applicant: Dell Products L.P., Round Rock, TX (US)

(72) Inventors: Avinash Kumar, Patna (IN); Roger M. Pepper, Plainville, MA (US); Donna Barry Lewis, Holly Springs, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/186,574

(22) Filed: Apr. 22, 2025

(51) Int. Cl.
*G06F 16/18* (2019.01)
*G06F 16/11* (2019.01)
*G06F 16/16* (2019.01)
*G06F 16/185* (2019.01)

(52) U.S. Cl.
CPC .......... *G06F 16/185* (2019.01); *G06F 16/128* (2019.01); *G06F 16/164* (2019.01)

(58) Field of Classification Search
CPC ..... G06F 16/185; G06F 16/164; G06F 16/126
See application file for complete search history.

(56) References Cited

U.S. PATENT DOCUMENTS 11,030,311 B1 * 6/2021 Lopez .................... G06N 20/00
2018/0189143 A1 * 7/2018 Ananthapur Bache .....................
   H04N 19/172
2018/0357246 A1 * 12/2018 Strogov ................. G06N 5/025
2018/0373722 A1 * 12/2018 Ulasen .................. G06F 16/113

* cited by examiner

*Primary Examiner* — Loc Tran
(74) *Attorney, Agent, or Firm* — Staniford Tomita LLP

(57) ABSTRACT

Metadata about files present at clients is collected. The metadata includes values for a set of features associated with the files. The values are normalized and centroids are calculated. For each file, a comparison is performed of a normalized value of a feature associated with a file against a respective centroid calculated for the feature. Based on the comparison, the file is or is not backed up. A machine learning model is applied to files that have been backed up to tier the backed up files.

12 Claims, 9 Drawing Sheets

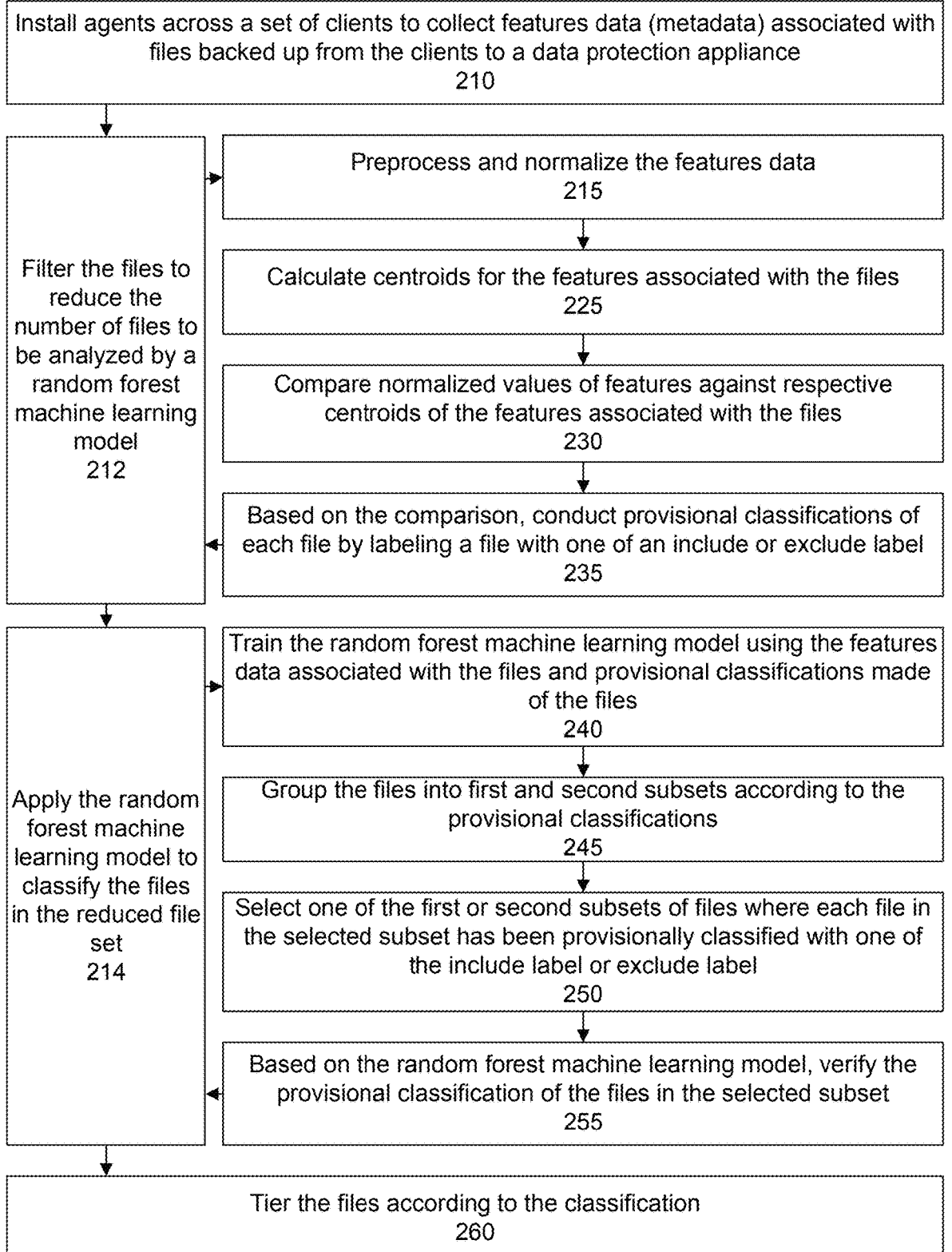

Install agents across a set of clients to collect features data (metadata) associated with files backed up from the clients to a data protection appliance
210

Filter the files to reduce the number of files to be analyzed by a random forest machine learning model
212

Preprocess and normalize the features data
215

Calculate centroids for the features associated with the files
225

Compare normalized values of features against respective centroids of the features associated with the files
230

Based on the comparison, conduct provisional classifications of each file by labeling a file with one of an include or exclude label
235

Apply the random forest machine learning model to classify the files in the reduced file set
214

Train the random forest machine learning model using the features data associated with the files and provisional classifications made of the files
240

Group the files into first and second subsets according to the provisional classifications
245

Select one of the first or second subsets of files where each file in the selected subset has been provisionally classified with one of the include label or exclude label
250

Based on the random forest machine learning model, verify the provisional classification of the files in the selected subset
255

Tier the files according to the classification
260

FIG. 2

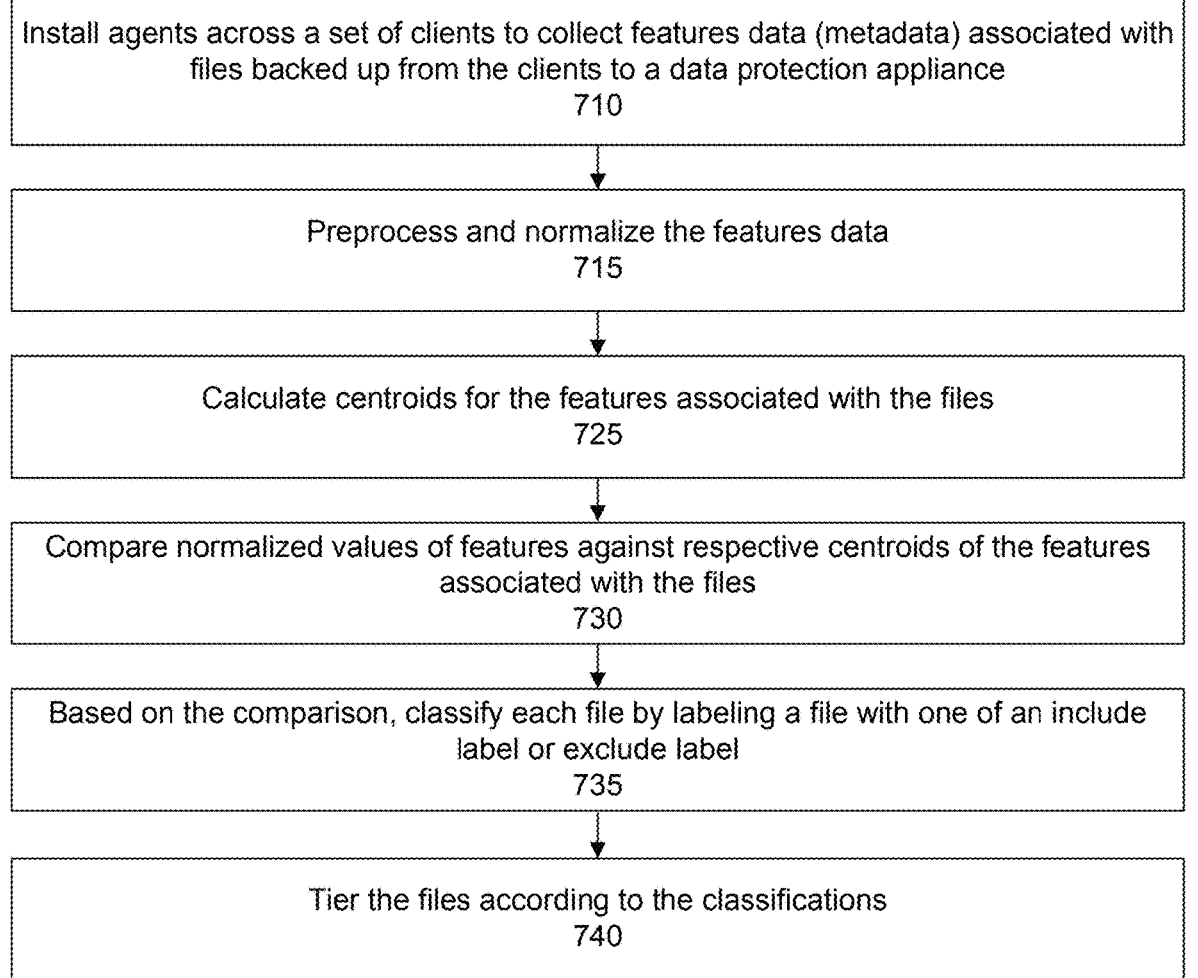

Install agents across a set of clients to collect features data (metadata) associated with files backed up from the clients to a data protection appliance
710

Preprocess and normalize the features data
715

Calculate centroids for the features associated with the files
725

Compare normalized values of features against respective centroids of the features associated with the files
730

Based on the comparison, classify each file by labeling a file with one of an include label or exclude label
735

Tier the files according to the classifications
740

FIG. 7

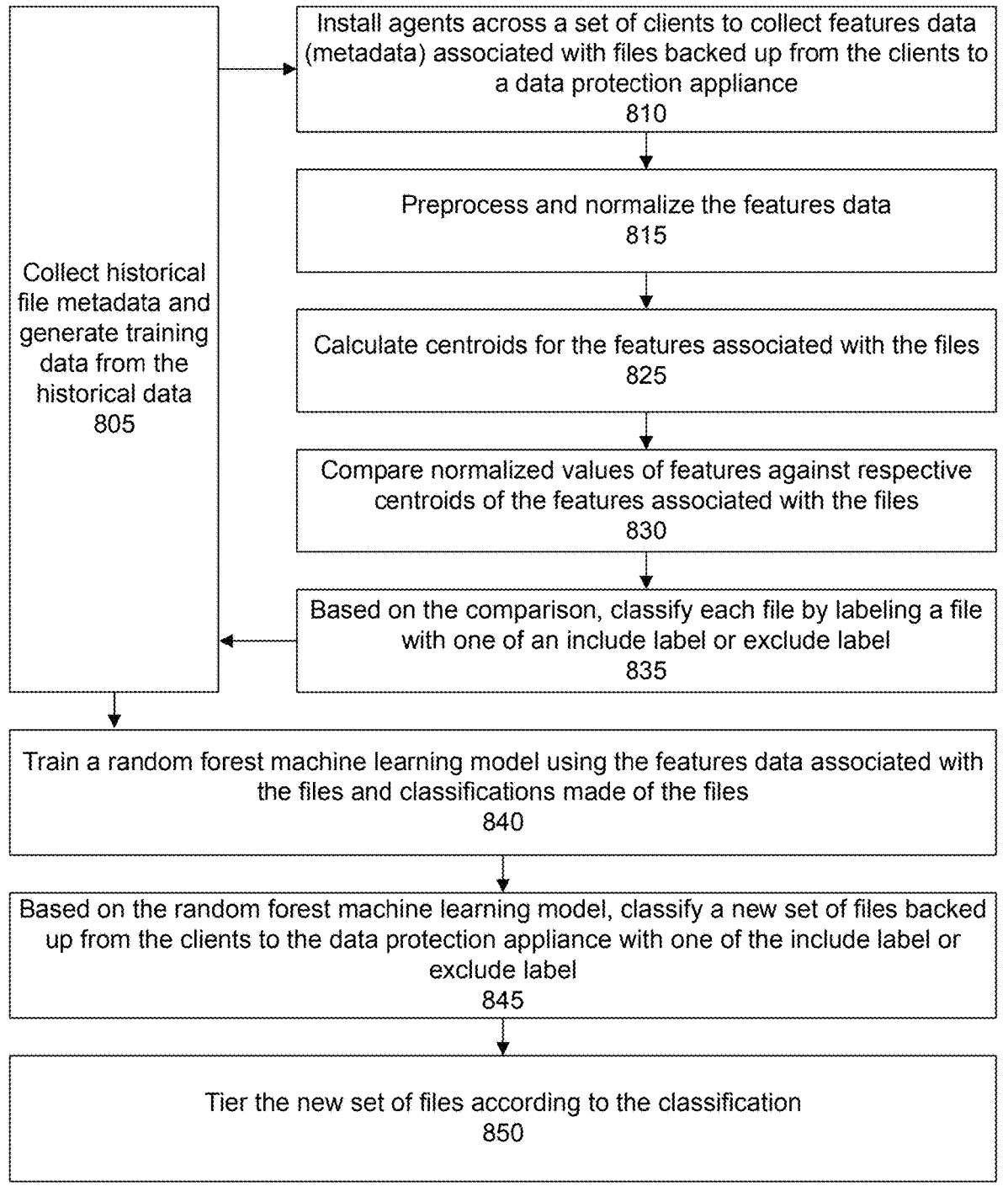

Collect historical file metadata and generate training data from the historical data
805

Install agents across a set of clients to collect features data (metadata) associated with files backed up from the clients to a data protection appliance
810

Preprocess and normalize the features data
815

Calculate centroids for the features associated with the files
825

Compare normalized values of features against respective centroids of the features associated with the files
830

Based on the comparison, classify each file by labeling a file with one of an include label or exclude label
835

Train a random forest machine learning model using the features data associated with the files and classifications made of the files
840

Based on the random forest machine learning model, classify a new set of files backed up from the clients to the data protection appliance with one of the include label or exclude label
845

Tier the new set of files according to the classification
850

FIG. 8

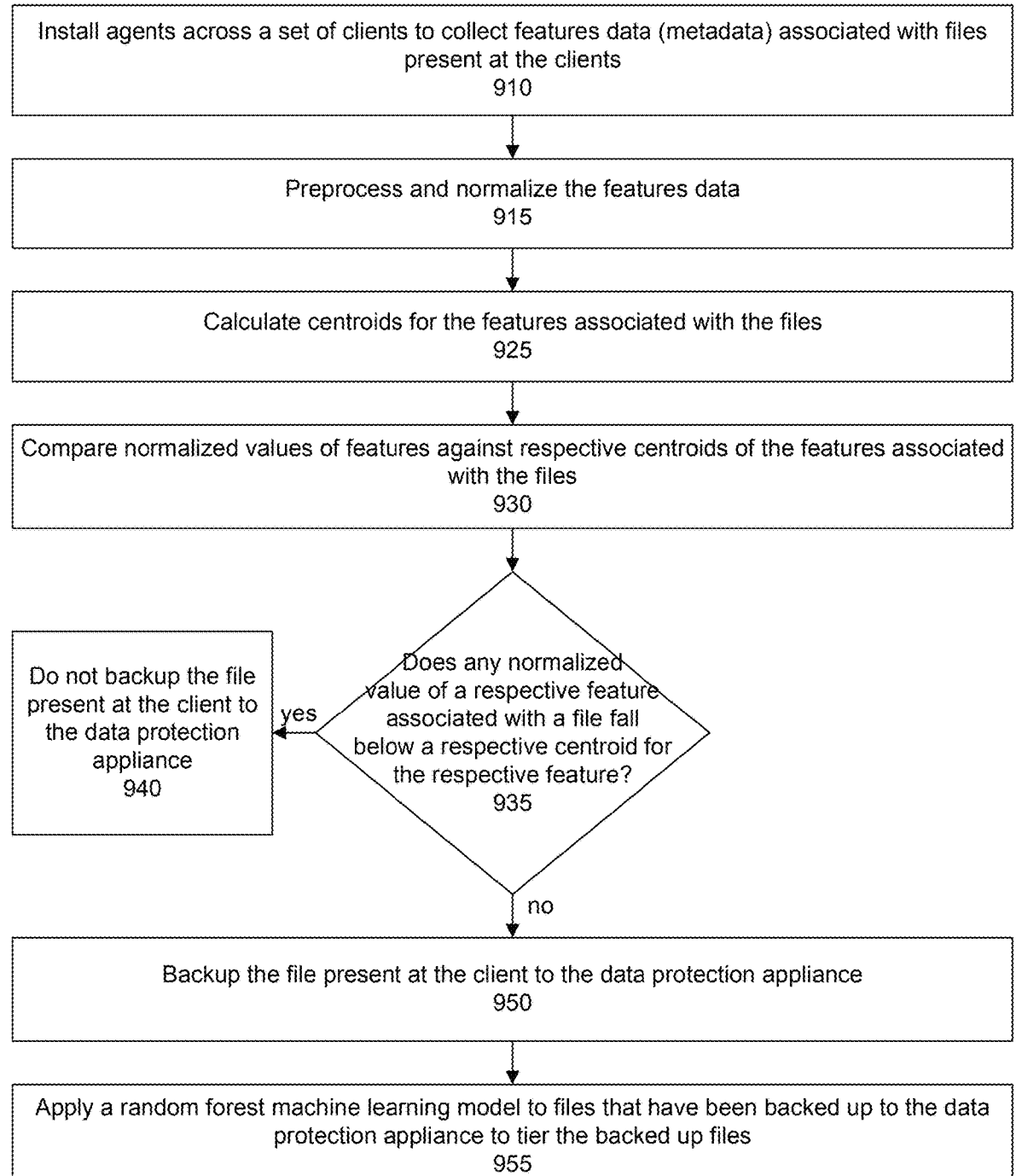

Install agents across a set of clients to collect features data (metadata) associated with files present at the clients
910

Preprocess and normalize the features data
915

Calculate centroids for the features associated with the files
925

Compare normalized values of features against respective centroids of the features associated with the files
930

Does any normalized value of a respective feature associated with a file fall below a respective centroid for the respective feature?
935

Do not backup the file present at the client to the data protection appliance
940 yes no

Backup the file present at the client to the data protection appliance
950

Apply a random forest machine learning model to files that have been backed up to the data protection appliance to tier the backed up files
955

FIG. 9

AI-DRIVEN DYNAMIC DATA EXCLUSION ENGINE FOR EFFICIENT CLOUD TIERING IN STORAGE SYSTEMS

CROSS-REFERENCE TO RELATED APPLICATIONS

This application is related to co-pending U.S. patent applications Ser. No. 19/186,592, filed Apr. 22, 2025, and Ser. No. 19/186,599, filed Apr. 22, 2025, and are incorporated herein by reference for all purposes.

TECHNICAL FIELD

The present invention relates generally to information processing systems, and more particularly to tiering files.

BACKGROUND

Virtually all organizations have a backup system to protect against data loss. A backup system functions by storing backup copies of the organization's data. If, for example, a primary copy of data is lost such as via accidental deletion, hardware failure, or other disaster, the data can be recalled from the backup system. As the organization continues to grow and generate data, the costs to maintain the backup copies on the backup system likewise continues to grow.

Conducting backups and storing backups can consume compute resources, storage, and network bandwidth. Applications to be protected by the backup system may generate numerous files and it may not be desirable or required to create backup copies of each and every file or, if backed up, be stored on high performance backup devices. High performance backup devices can provide quick access to backup copies, but such storage devices can be expensive to purchase and maintain as compared to lower performance backup devices. There is a need for improved systems and techniques to identify files for backup and manage the movement of files among different tiers of backup storage.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY

In an embodiment, metadata about files present at clients is collected. The metadata includes values for a set of features associated with the files. The values are normalized and centroids are calculated. For each file, a comparison is performed of a normalized value of a feature associated with a file against a respective centroid calculated for the feature. Based on the comparison, the file is or is not backed up. A machine learning model is applied to files that have been backed up to tier the backed up files.

In another embodiment, values corresponding to a set of features associated with each file of a set of files are collected. The features include an access frequency, modification time, sensitivity level, retention priority, and file type. The values are normalized and centroids are calculated. Normalized values and corresponding centroids of features of the files are compared. The files are tiered based on the comparison.

In another embodiment, agents are installed across a set of clients to collect values for a set of features associated with files backed up from the clients to a data protection appliance. Each file is classified as being one of included or excluded based on the collected data. Files classified as included are allowed to remain at the appliance. Files classified as excluded are moved from the appliance to cloud storage. A machine learning model is trained using the collected data. The machine learning model is applied to classify a new set of files.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 2 shows an overall flow of a process for handling backups, according to one or more embodiments.

FIG. 7 shows another flow of a process for handling backups, according to one or more embodiments.

FIG. 8 shows another flow of a process for handling backups, according to one or more embodiments.

FIG. 9 shows another flow of a process for handling backups, according to one or more embodiments.

DETAILED DESCRIPTION

Figure 1:
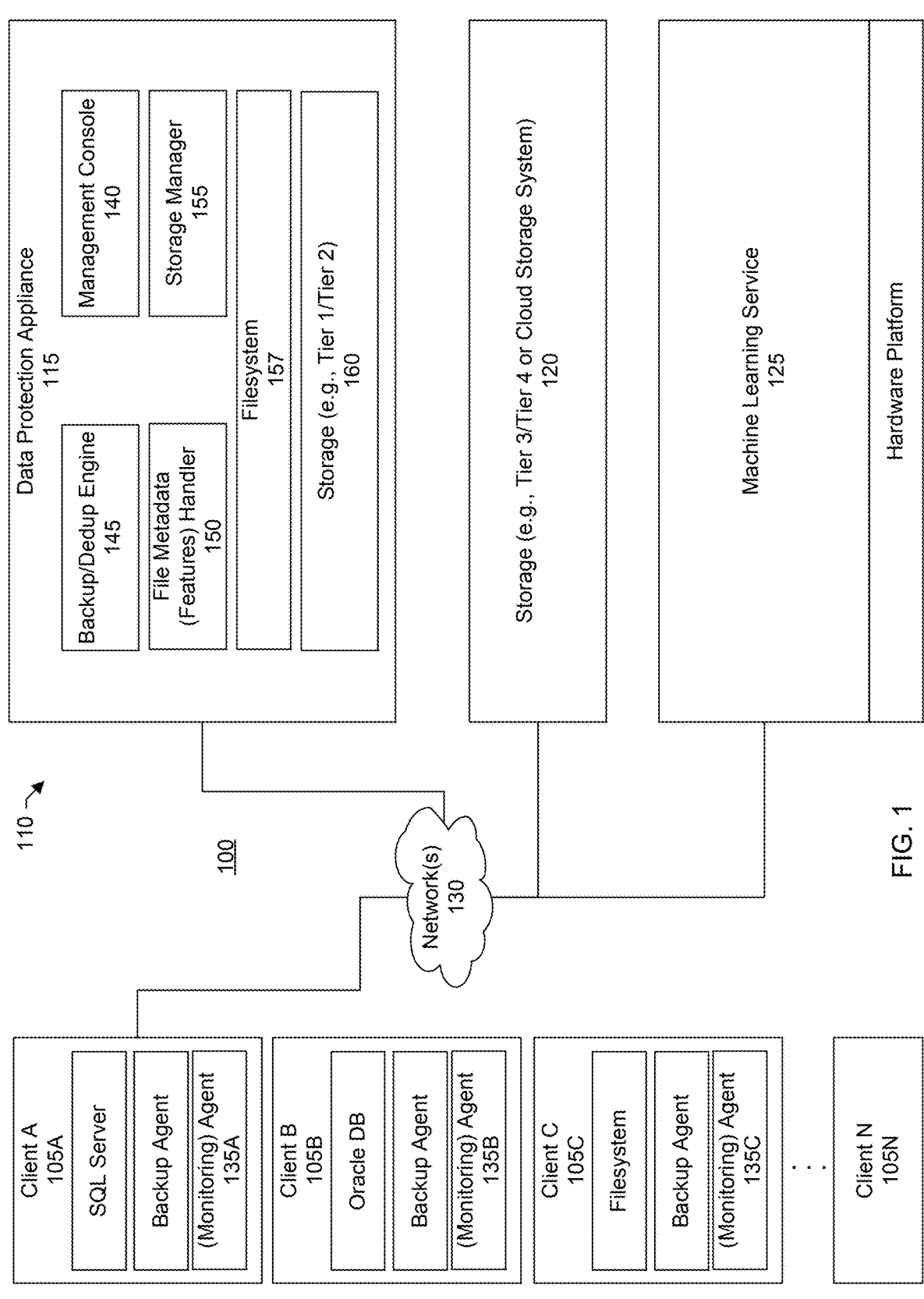
FIG. 1 shows a block diagram of an information processing system for intelligently identifying files for backup and managing the movement of backup files among different tiers of backup storage, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two. It should be appreciated that the blocks, components, and modules shown in the figures may be functional and there can be many different hardware configurations, software configurations, or both to implement the functions described.

Disclosed herein are methods and systems for data tiering. Data tiering enables the seamless movement of data across various storage tiers, ensuring that data resides on the appropriate storage technology based on performance and cost considerations. In an embodiment, this process is automated and controlled by storage policies, making it invisible to end-user applications. Storage tiers may be categorized into four levels. Tier 1 storage may include flash storage for high-performance needs. Tier 2 storage may include storage area networks/network attached storage (SAN/NAS) storage arrays for medium performance and value. Tier 3 storage may include object storage for infrequently accessed large datasets. Tier 4 storage may include public cloud storage for long-term archival data. Structured data sets from applications like databases, customer relationship management systems (CRMs), and virtual machines (VMs) primarily reside in tiers 1 and 2, whereas unstructured data typically moves to tiers 3 and 4 due to cost sensitivity and lower performance requirements.

Public cloud services have emerged as a cost-effective solution for tiering unstructured data; however, they come with specific challenges. Performance bottlenecks occur when accessing data over public networks, especially for backup operations that require optimized recovery windows. Security regulations in certain industries restrict storing specific datasets in the cloud, necessitating granular control over data movement. Additionally, frequent data access patterns can incur high bandwidth costs, and storing massive amounts of data in the cloud may not always be economically practical compared to on-premises solutions. These factors make effective and intelligent cloud tiering solutions crucial for managing data efficiently.

There are challenges when integrating public cloud tiering with on-premises environments, especially in determining the right amount of data to tier for achieving optimal space and throughput efficiency. Existing algorithms often focus on balancing data volume and throughput but fail to account for the processing overhead caused by unsuitable data. In an embodiment, this inefficiency is addressed by a preliminary filtering mechanism to assess data quality before tiering decisions are made. The filter helps to reduce unnecessary processing and training overhead that can degrade the performance of tiering models, leading to inefficiencies in data movement strategies.

The following non-limiting definitions may be helpful in understanding the specification and claims:

Centroid Calculation: Determines a benchmark value by computing the average of normalized features (e.g., access pattern, file type, and others) across a set of files to decide their inclusion or exclusion in the backup process.

Feature Normalization: The process of scaling file-related attributes (like access frequency and file sensitivity) to a uniform range to ensure consistency in the model's input data.

Random Forest Algorithm: An ensemble learning technique used to classify files based on various features by combining the outputs of multiple decision trees, enhancing accuracy and preventing overfitting.

Tiering: The process of categorizing files into different backup tiers (e.g., Gold, Silver, Bronze) based on their relevance, retention requirements, and other features for efficient resource utilization.

Inclusion/Exclusion Decision: A classification task that predicts whether a file should be included or excluded from the backup framework based on its features and the patterns learned by the centroid-based and artificial intelligence (AI)-driven models.

As organizations increasingly adopt tiered storage solutions, efficiently managing data movement to public cloud storage has become critical. While public cloud serves as an ideal solution for long-term archival of unstructured data, challenges related to cost, performance bottlenecks, and resource overhead persist. Existing approaches fail to dynamically exclude non-critical data, leading to suboptimal resource utilization and increased expenses.

There is a need to dynamically exclude non-critical data during the tiering process to reduce resource overhead and improve storage efficiency without compromising performance or cost-effectiveness.

In an embodiment, an information processing system as shown in FIG. 1 provides a hybrid semi-analytical and analytical approach to intelligently filter data for tiering decisions. In an embodiment, artificial intelligence (AI) techniques are used to facilitate decisions on files for backup and management of backed up files among different tiers of storage. The system can be trained to recognize patterns regarding certain attributes associated with files and make decisions on backup and, more specifically, the storage tiers at which the file backups should be stored.

In the example shown in FIG. 1, a set of clients 105A-N are connected to a backup system 110. The backup system includes a data protection appliance 115. Files present at the clients are primary copies while files backed up to the backup system, including data protection appliance, are secondary copies. The secondary copies or backups may be stored in a format (e.g., compressed format or deduplicated format) that is different from a native format of the primary copies at the clients.

The data protection appliance may reside on premise of a customer organization or enterprise. There is a cloud storage system 120, remote from the data protection appliance, and a machine learning service 125. A network 130 allows the various components of the information processing system to communicate with each other.

In an embodiment, the cloud storage system is provided by a cloud service provider and the machine learning service is provided by a vendor of the data protection appliance. The machine learning service may be hosted on information technology (IT) infrastructure that is physically located and managed within a data center of the vendor's facilities rather than that of the customer enterprise. In an embodiment, the machine learning service generates and maintains a random forest machine learning model that classifies files based on metadata associated with the files. The files may be backed up or tiered based on their classifications. In other embodiments, other machine learning models may instead or additionally be used. Some examples of other machine learning models include classification models, deep learning models, and artificial neural networks among others.

In an specific embodiment, the cloud service provider is an entity different from the customer enterprise, vendor of the data protection system, or both. For example, the cloud storage provider may provide a public cloud. Some examples of cloud service providers or public clouds include Amazon Web Services® (AWS Cloud) as provided by Amazon, Inc. of Seattle, Washington; Microsoft Azure® as provided by Microsoft Corporation of Redmond, Washington; Google Cloud® as provided Alphabet, Inc. of Mountain View, California; and others. The cloud service provider makes resources available as services to its tenants over the network (e.g., internet). The cloud service provider, however, is responsible for the underlying infrastructure. For example, Amazon Simple Storage Service (S3) provides storage for customer data in object storage. Data, such as files, may be stored as objects in logical containers referred to as buckets.

The clients host applications that generate data such as files that may be backed up by backup agents installed at the clients to the data protection appliance in coordination with a backup management server or application. A backup agent may interface with or include a client-side deduplication library to facilitate efficient backup and restoration operations. Backups may be conducted according to a backup schedule. For example, backups may be conducted hourly, daily, weekly, or at any interval as desired. Some examples of applications include databases (e.g., SQL Server, Oracle Database), filesystems, productivity applications, and so forth.

Monitoring agents 135A-N are installed across the clients. These agents are responsible for collecting metadata on files present at the clients. Some or all the files may be backed up to the data protection appliance. The metadata may be referred to as features data. In an embodiment, the metadata includes information concerning access pattern (e.g., frequency of reads/writes), modification time (e.g., m-time), file type, file sensitivity, and retention requirements. An agent may reside at the application level or operating system level, e.g., driver level, in order to monitor and collect file metadata.

The data protection appliance includes a management console 140, backup and deduplication engine 145, file metadata handler 150, storage manager 155, filesystem 157, and storage 160. The management console is a user interface to the data protection appliance. The user interface may be a graphical user interface (GUI) or command line (CL) interface. In an embodiment, another application may interface with the appliance through an application programming interface (API) exposed by the appliance. In an embodiment, the user (e.g., backup administrator) uses the management console to define the data management policies, identify the client data (e.g., files) that are subject to the data management policies, define a backup schedule, configure storage tiering settings, view a backup catalog listing files backed up by the appliance, and perform other configuration and administrative tasks.

The backup and deduplication engine is responsible for managing the backup and deduplication of files from the clients in conjunction with the backup agents. The filesystem provides a way to organize data stored at or by the data protection appliance and present that data to clients and applications in a logical format. Files stored at or managed by the data protection appliance may be indexed. Indexing creates a searchable catalog of metadata associated with the files to enable efficient search and retrieval of specific files or data within backups.

The filesystem organizes the data into files and folders into which the files may be stored. When a client requests access to a file, the filesystem issues a file handle or other identifier for the file to the client. The client can use the file handle or other identifier in subsequent operations involving the file. A namespace of the filesystem provides a hierarchical organizational structure for identifying file system objects through a file path. A file can be identified by its path through a structure of folders and subfolders in the filesystem. A filesystem may hold many hundreds of thousands or even many millions of files across many different folders and subfolders and spanning thousands of terabytes.

The filesystem may be a deduplication filesystem. Deduplication allows for efficient storage of the backed up data. In a specific embodiment, a file or other data object to be backed up is segmented. Fingerprints or hashes are calculated for the segments. The fingerprints may be compared against a fingerprint or deduplication index identifying segments already existing at the backup system. A matching fingerprint indicates that the corresponding data segment already exists at the backup system. In this case, rather than transmitting the segment from the client to backup system, a reference to the segment can be created and maintained at the backup system so that the file can be reconstructed. A non-matching fingerprint indicates that the corresponding segment does not exist at the backup system and therefore should be transmitted to the backup system.

The backup agents may include client-side deduplication libraries to facilitate efficient backups and filesystem operations. In an embodiment, when the backup agent or other application seeks to perform a filesystem operation, the backup agent issues a call (e.g., application programming interface (API) call) to the client-side deduplication library to request the filesystem operation. The client-side deduplication library processes and forwards the request to the data protection appliance for fulfillment. The results of the request are returned by the data protection appliance to the client-side library which, in turn, passes the results back to the requesting backup agent or client application. An example of a client-side deduplication library is Data Domain Boost (DDBoost) as provided by Dell Technologies of Round Rock, Texas. Some embodiments are described in conjunction with the DDBoost protocol, Data Domain Restorer (DDR) storage system, and Data Domain file system as provided by Dell Technologies. It should be appreciated, however, that principles and aspects discussed can be applied to other filesystems, filesystem protocols, and backup storage systems.

In an embodiment, the clients access the filesystem using a protocol referred to as DDBoost. DDBoost is a system that distributes parts of a deduplication process to the application clients, enabling client-side deduplication for faster, more efficient backup and recovery. In an embodiment, the clients use the DDBoost backup protocol to conduct backups of client data to the data protection appliance, restore the backups from the appliance to the clients, or perform other data protection operations. The DDBoost library exposes application programming interfaces (APIs) to integrate with a Data Domain system using an optimized transport mechanism. These API interfaces exported by the DDBoost library provide mechanisms to access or manipulate the functionality of a Data Domain file system. Embodiments may utilize the DDBoost File System Plug-In (BoostFS), which resides on the application system and presents a standard filesystem mount point to the application. With direct access to a BoostFS mount point, the application can leverage the storage and network efficiencies of the DDBoost protocol for backup and recovery. A client may run any number of different types of protocols as the filesystem supports multiple network protocols for accessing remote centrally stored data (e.g., Network File System (NFS), Common Internet File System (CIFS), Server Message Block (SMB), and others).

The file metadata handler is responsible for receiving and processing the file metadata collected by the individual monitoring agents installed at the clients. In an embodiment, the file metadata may be referred to as features data. The processed features data is provided to the storage manager. In an embodiment, the storage manager employs a clustering technique on the received features data to classify, tag, or label files as being "included" or "excluded." Files labeled as included are allowed to remain on tier 1 or tier 2 storage of the data protection appliance. Files labeled as excluded are moved from the data protection appliance to tier 3 or tier 4 storage such as may be provided by cloud storage. In an embodiment, moving a file from the data protection appliance to a different storage tier includes replacing the file with a link or reference that points to a new location of the file. The link or reference allows the file to be accessed by the data protection appliance even though the file itself (e.g., content of the file) resides on a different storage system.

In another embodiment, the clustering technique may be used to make determinations on whether to include files present at a client in a backup of the client.

In an embodiment, a tiering decision begins with a semi-analytical approach that uses a centroid calculation to pre-filter data. A centroid score is computed using features such as access pattern (frequency of reads/writes), m-time, file type, file sensitivity, retention requirements, or combinations of these. These features are gathered in real-time by a lightweight agent (e.g., monitoring agent) sitting on the client system. The centroid technique helps classify data based on its suitability for tiering: files with high mtime, low sensitivity, and infrequent access will have higher centroid scores and become candidates for tiering.

Once the initial pre-filtering is complete, the hybrid technique transitions to the analytical phase using a machine learning-based predictive model to refine the tiering decisions. The analytical model is trained on features such as historical access patterns, retention trends, data lifecycle stages, file types, and sensitivity levels.

In an embodiment, a random forest regression model is used for centroid prediction due to its ability to handle complex data relationships and feature importance evaluation. The model predicts the suitability of each file for tiering by assigning a centroid score, while minimizing false positives and improving accuracy.

Combining the semi-analytical and analytical approaches ensures efficiency and precision. The semi-analytical filter reduces unnecessary data processing upfront, while the analytical model, trained on historical metadata and patterns, ensures tiering decisions align with real-world behaviors. This two-stage approach optimizes cloud resource utilization while maintaining compliance and performance requirements.

In an embodiment, one or more of semi-analytical techniques (e.g., centroid calculations and normalized value comparisons), analytical techniques (e.g., machine learning), or both may be applied to identify files at a client that should be included in a backup to the data protection appliance and files at the client that should not be included in the backup to the data protection appliance. For example, it may not be desirable to backup each and every file at a client. It may be desirable to exclude certain files from a backup such as temporary log files. Files at a client that should be backed up and files at the client that should not be backed up can have different characteristics regarding access pattern, modification time, file type, file sensitivity, and retention requirements. These characteristics may be examined using one or more of semi-analytical techniques, analytical techniques, or both to make decisions on whether to include a file for backup and, if backed up, determine a storage tier at which the backed up file should be placed.

FIG. 2 shows an overall flow of a hybrid technique to handle storage tiering, according to one or more embodiments. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 210, agents (e.g., monitoring agents) are installed across a set of clients to collect metadata (e.g., features data)

associated with files backed up from the clients to a data protection appliance. An agent is responsible for monitoring and gathering attributes about files at the client and sending the collected metadata to the data protection appliance for further processing. In an embodiment, the metadata includes attributes that may be associated with the files such as an access pattern (frequency of reads/writes), m-time, file type, file sensitivity, and retention requirements of the files. The attributes of the files may be referred to as features. An access pattern of a file may be collected over a rolling period of time. The access pattern indicates a number of times an application at a client accesses a file at the client over the period of time. An access may include both a read access and a write access. The period of time may be configured as 1 hour, 2 hours, 1 day, 1 week, 1 month, or any other period of time as desired.

The modification time (e.g., m-time) indicates the time and date when the file was last accessed by the client application.

The file type indicates a format of the file. Some examples of file types include portable document format (PDF), DOC/DOCX (e.g., Microsoft Word documents), TXT (e.g., text files), joint photographic experts group (JPEG) (e.g., image format), and MP3/MP4 (e.g., audio/video formats), among others.

The file sensitivity indicates a degree of confidentiality attached to the content of the file. For example, a file having a sensitivity level 1 may indicate that contents of the file are highly confidential. A file having a sensitivity level of 5 may indicate that the contents of the file are unclassified.

The retention requirement or retention priority indicate the duration of time for which a file is to be retained. For example, a retention priority of high on a file may indicate that the file is to be retained indefinitely or for a long period of time (e.g., seven years). A retention priority of medium on a file may indicate that the file is to be retained for a moderate period of time (e.g., three years). A retention priority of low on a file may indicate that the file is to be retained for a short period of time (e.g., 1 year).

As discussed, in an embodiment, a tiering technique conducts a filtering or pre-filtering on the files backed up to the data protection appliance as an initial step before applying a random forest machine learning model to the filtered or reduced file set (step 212). The initial step may be referred to as a semi-analytical phase. In brief, in a step 215, the features data associated with the files is preprocessed and normalized. In a step 225, centroids are calculated for the features associated with the files. In a step 230, normalized values of the features are compared against the respective centroids calculated for the features. In a step 235, based on the comparison, provisional classifications are made by labeling a file with one of an include label or an exclude label.

In the next phase, the random forest machine learning model is applied to make a final determination on the classification of the files in the reduced file set as being one of included or excluded (step 214). The second phase may be referred to as an analytical phase. In an embodiment, files labeled as included are allowed to remain on high performance storage of the data protection appliance. Files labeled as excluded are moved from the high performance storage of the data protection appliance to different storage, such as cloud storage, having performance characteristics that are lower than storage belonging to the data protection appliance.

In brief, in a step 240, the random forest machine learning model is trained using the features data associated with the files and the provisional classifications made of the files. In a step 245, the files are grouped into first and second subsets according to the provisional classifications. For example, files provisionally classified with the include labels may be grouped into the first subset. Files provisionally classified with the exclude labels may be grouped into the second subset.

In a step 250, a selection is made of one of the first or second subsets of files to which the random forest machine learning model is applied to verify or confirm the classification. In an embodiment, the selection is of the files that have been provisionally classified as excluded (e.g., files identified as candidates to be moved from the data protection appliance to cloud storage).

In another embodiment, the selection is of the files that have been provisionally classified as included (e.g., files identified as being allowed to remain on the data protection appliance). In another embodiment, the selection of a particular subset of files is dynamic. For example, in an embodiment, a count may be conducted of a number of files in the first subset and a number of files in the second subset. In this embodiment, the subset of files having the fewest number of files is selected for application of the machine learning model to confirm the provisional labeling of the files in the subset. Applying machine learning can be a compute-intensive process due to the often large datasets and mathematical operations that are involved. Winnowing down the number of files that the machine learning model is to analyze can greatly reduce the compute requirements and thus cost.

In a step 255, the random forest machine learning model is applied to the files in the selected subset to verify or confirm the preliminary classifications. In a step 260, the files are tiered according to the classifications.

In an embodiment, a classification of a file made by the machine learning model takes precedence over a preliminary classification made using the centroid calculation. Consider, as an example, a file having been given a preliminary classification of exclude, the file thereby being identified as a candidate for moving from the data protection appliance to cloud storage. The machine learning model, however, may re-classify the file as include. In this case, the file remains at the data protection appliance.

In other embodiments, file classification can be performed using techniques of the semi-analytical phase (e.g., centroid calculations and comparisons) and without using techniques of the analytical phase (e.g., machine learning). As discussed, machine learning can be very compute intensive and a customer may not wish to pay for the added service. Further, the customer may prefer to not submit their file metadata to the machine learning service since the machine learning service may be hosted on infrastructure not owned or managed by the customer. For example, corporate data security policies of the customer enterprise may prevent the transmission of file metadata to data centers or other facilities not owned or managed by the customer.

Alternatively, in another embodiment, a customer may choose to apply the machine learning model to the entire file set (e.g., files provisionally classified with an include label and files provisionally classified as with an exclude label via the centroid calculations and comparisons).

In another embodiment, a technique includes determining whether a file at a client should be included in a backup. The technique may include semi-analytical techniques (e.g., centroid calculations and comparisons), machine learning, or both. As an example, consider temporary log files. Temporary log files are short-lived log files that store system events, application activities, or debugging information for a limited time. These files help with troubleshooting, performance monitoring, or debugging but are usually deleted or overwritten after a certain period. Features data collected for such a file may indicate a low sensitivity, no retention requirement, and infrequent access. Applying one or more of semi-analytical techniques, machine learning, or both may result in the file not qualifying for backup to the data protection appliance. As a result, the file may remain solely at the client.

In an embodiment, systems and techniques include determining which files to back up to the data protection appliance. In this embodiment, a semi-analytical approach is applied to ensure efficient pre-filtering of files before they are backed up. By incorporating centroid-based calculations, a determination is made as to whether a file should be included or excluded from the backup process based on key attributes such as access frequency, file sensitivity, modification time (m-time), and retention priority. The feature normalization process further enhances decision-making by ensuring that diverse file attributes are transformed into a consistent range for analysis. This step minimizes or helps to reduce unnecessary storage of redundant or irrelevant files, optimizing backup efficiency and reducing storage overhead.

In another embodiment, systems and techniques include classifying files backed up to the data protection appliance for cloud storage migration. In this embodiment, the inclusion/exclusion decision framework extends beyond initial backup selection and is used to classify already backed-up files for cloud migration. Centroid-based pre-filtering enables files with higher access frequency and retention priority to remain on local storage, while less frequently accessed files are candidates for cloud migration.

This classification ensures that the most appropriate data is retained on the data protection appliance while leveraging cloud storage for archival purposes, improving storage utilization and cost efficiency.

In another embodiment, systems and techniques include classifying a subset of backed-up files for random forest machine learning model verification. This embodiment includes an explicit step where a subset of backed-up files is classified and fed into the random forest model for verification. This step serves as a validation mechanism, where the predictive model can be assessed against real-world data, refining its accuracy in predicting tiering decisions. By continuously validating and refining the model with updated classification results, we enhance its ability to generalize effectively across diverse file types and storage policies.

In another embodiment, systems and techniques include training the random forest machine learning model. This embodiment includes an analytical phase where historical file access patterns, retention trends, and sensitivity levels are used to train the random forest model.

The model is structured to improve tiering decisions by learning from past data movements and predicting whether new files should be included, excluded, or migrated to the cloud. Additionally, a method of random feature selection and decision tree ensemble learning prevents overfitting and improves model generalization.

Figure 3:
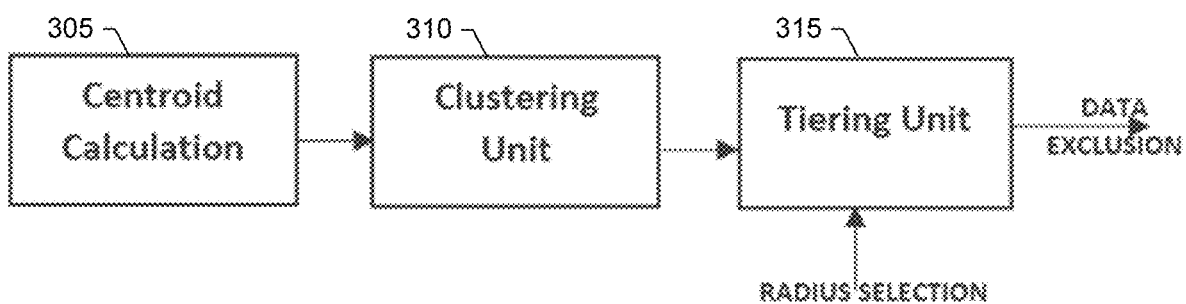
FIG. 3 shows a block diagram of components that may be involved with a semi-analytical technique for managing backups, according to one or more embodiments.

FIG. 3 shows a block diagram of components that may be involved with the semi-analytical phase. As shown in the example of FIG. 3, these components include a centroid calculation 305, clustering unit 310, and tiering unit 315. As discussed, in an embodiment, a tiering technique includes a semi-analytical phase and an analytical phase. In an embodiment, the semi-analytical phase includes calculation of centroids. The centroid of the dataset is calculated to determine a threshold for inclusion or exclusion of backup files. The semi-analytical phase may be further divided into three submodules or subphases including data preprocessing and feature normalization, centroid calculation, and threshold-based inclusion/exclusion.

During the data preprocessing and feature normalization subphase, the input features such as access frequency, modification time (m-time), file sensitivity, retention priority, and file type are normalized to ensure consistency across the dataset. In an embodiment, normalization is performed using a Min-Max scaling formula as shown below:

$$X_{scaled} = \frac{X - X_{min}}{X_{max} - X_{min}}$$

As an example, consider the feature access frequency (e.g., number of times a file is accessed in a month) for three files, file_01, file_02, and file_03, as shown in Table A below.

TABLE A

| File ID | Original Access Frequency |
|---------|---------------------------|
| File_01 | 5 |
| File_02 | 20 |
| File_03 | 50 |

In the above example, $X_{min}$=(minimum access frequency), and $X_{max}$=(maximum access frequency).

The following Tables B-D show calculating the normalized value $X_{scaled}$ for each file.

TABLE B

| (file_01) |
|-----------|
| $X_{scaled} = \dfrac{5 - 5}{50 - 5} = \dfrac{0}{45} = 0$ |

TABLE C

| (file_02) |
|-----------|
| $X_{scaled} = \dfrac{20 - 5}{50 - 5} = \dfrac{15}{45} = 0.33$ |

TABLE D

| (file_03) |
|-----------|
| $X_{scaled} = \dfrac{50 - 5}{50 - 5} = \dfrac{45}{45} = 1$ |

Table E below summarizes the original access frequency and normalized access frequency calculation for the files.

TABLE E

| File ID | Original Access Frequency | Normalized Access Frequency |
|---------|---------------------------|------------------------------|
| File_01 | 5 | 0.00 |
| File_02 | 20 | 0.33 |
| File_03 | 50 | 1.00 |

This normalization process ensures that all input features are transformed into a standardized range between 0 and 1, facilitating consistent centroid calculations in the next phase.

As discussed, in an embodiment, normalization is performed using the Min-Max scaling formula. In other embodiments, however, different normalization techniques may be used. Some examples of normalization techniques include Z-score normalization and unit vector normalization among others.

Once the features are normalized, the process advances to calculating the centroid for each feature. The centroid represents the average value of the normalized feature values across all files, helping to establish a benchmark for decision-making. The centroid calculation for each feature is performed using the formula:

$$X_{scaled} = \frac{5-5}{50-5} = \frac{0}{45} = 0$$

Where, C is the centroid, $X_i$ is the normalized feature value for each file, and n is the total number of files.

Figure 4:
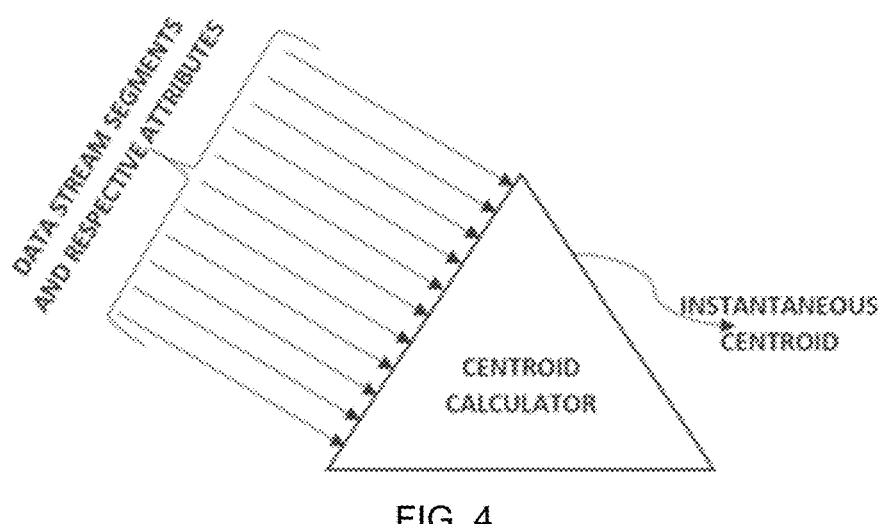
FIG. 4 shows a block diagram illustrating inputs to a centroid calculator, according to one or more embodiments.

For each file, the centroid score acts as a threshold to determine which files are more aligned with the desired characteristics for inclusion in the indexing framework. FIG. 4 shows a graphical representation of centroid calculation from an input data stream of file attributes (e.g., features).

Once the centroids are computed, a comparison is conducted of the normalized feature values of each file against the centroid to derive an inclusion or exclusion score. Files with normalized feature values that are below the threshold are excluded, while those above the threshold are included in the indexing framework.

In this approach, each feature's normalized value is compared to its centroid score to establish a collective decision on whether a file should be included or excluded based on the threshold. This provides an efficient way to prioritize the backup files that are critical and eliminate those that are irrelevant.

Table F below summarizes the results of the threshold-based inclusion/exclusion technique.

TABLE F

| File ID | Access Frequency (Normalized) | Centroid Value | Include/Exclude |
|---------|---------|---------|---------|
| File_01 | 0.00 | 0.33 | Exclude |
| File_02 | 0.33 | 0.33 | Include |
| File_03 | 1.00 | 0.33 | Include |

In this case, file_01 falls below the centroid threshold, so it is excluded. File_02 and file_03 exceed or meet the centroid value and are included in the indexing framework (e.g., allowed to remain in storage of the data protection appliance). More particularly, as shown in the example of Table F, the feature identified as access frequency for file_01 has a normalized value of 0.00. The centroid threshold value for the feature access frequency is 0.33. The normalized value of 0.00 is below the centroid threshold value of 0.33. So, file_01 is classified with an exclude label.

The feature identified as access frequency for file_02 has a normalized value of 0.33. The centroid threshold value for the feature access frequency is 0.33. The normalized value of 0.33 is not below the centroid threshold value of 0.33. So, file_02 is classified with an exclude label.

Figure 5:
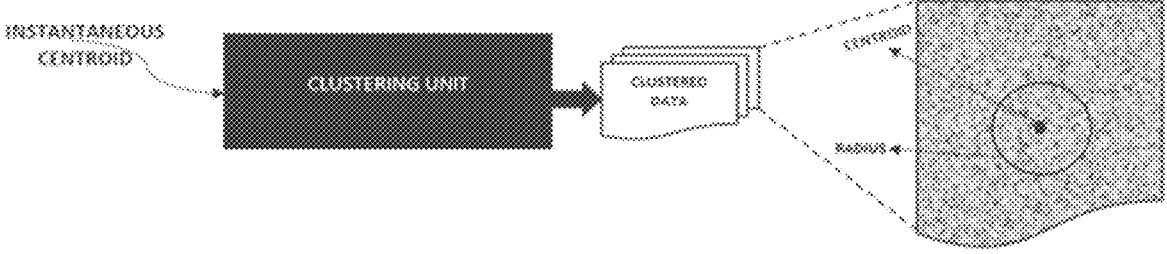
FIG. 5 shows a block diagram of clustering components, according to one or more embodiments.

The feature identified as access frequency for file_03 has a normalized value of 1.00. The centroid threshold value for the feature access frequency is 0.33. The normalized value of 1.00 is not below the centroid threshold value of 0.33. So, file_03 is classified with an exclude label. FIG. 5 shows a graphical representation of inputs and outputs of the clustering unit.

In an embodiment, if any normalized value of a respective feature associated with a file falls below the respective centroid calculated for the respective feature, the file is classified with an exclude label, the file thereby subject to being moved from a current storage tier having high performance characteristics to a different storage tier having performance characteristics lower than the current storage tier. If each normalized value of each respective feature associated with the file is equal to or above the respective centroid calculated for the respective feature, the file is classified with an include label, the file thereby being allowed to remain in the current storage tier having the high performance characteristics.

Figure 6:
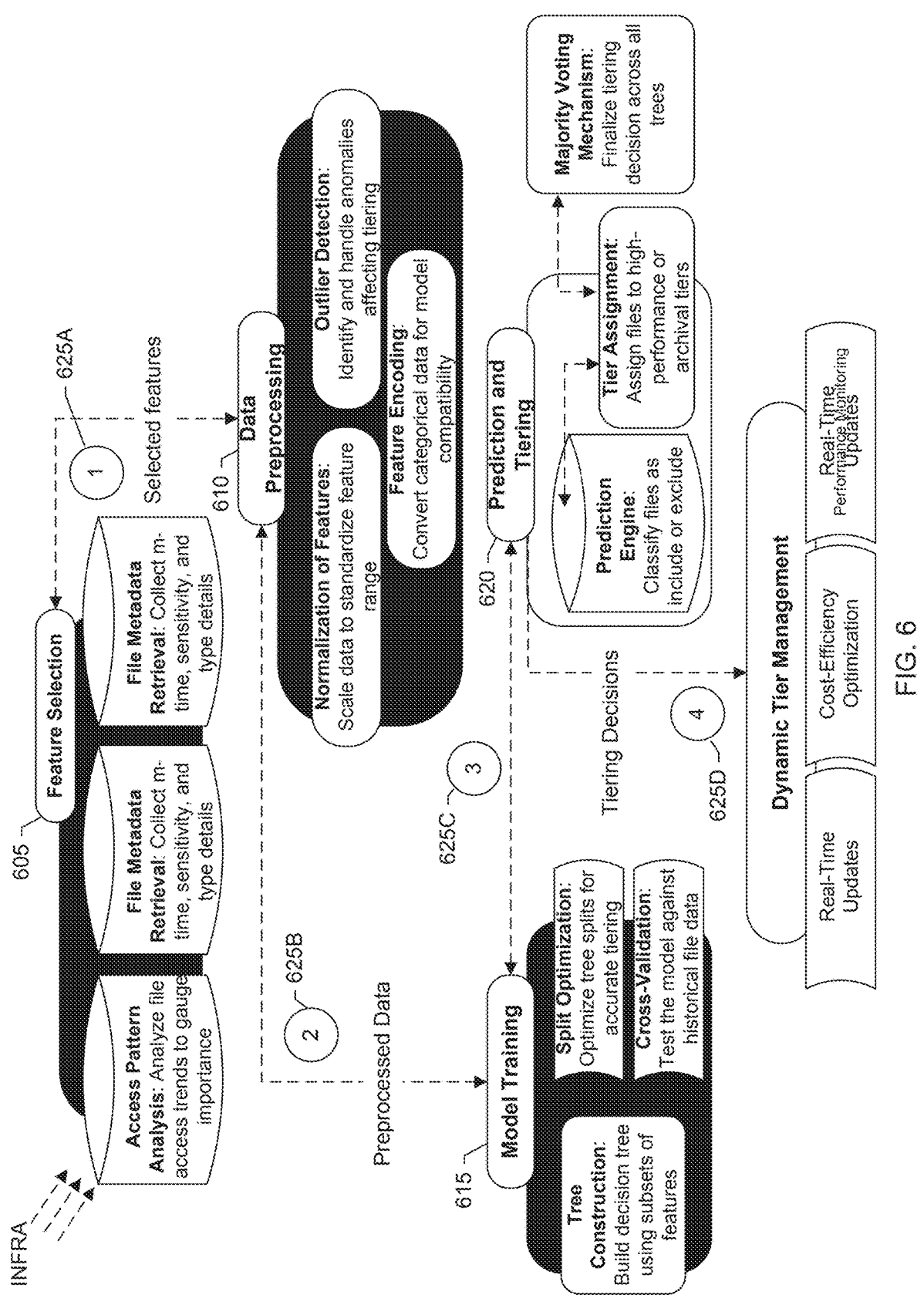
FIG. 6 shows a system diagram of components for applying a machine learning model to classify files, according to one or more embodiments.

FIG. 6 shows a system diagram for applying machine learning to dynamic tier management, according to one or more embodiments. Components shown in the example of FIG. 6 include feature selection 605, data preprocessing 610, model training 615, and prediction and tiering 620.

Feature selection includes collecting file attributes or metadata associated with files at the clients that are backed up to the data protection appliance. In an embodiment, a first feature includes access patterns or access frequency of a file at a client indicating a number of times over a period of time (e.g., one month) in which an application at the client has accessed the file for a read or write. A second feature includes a time and date indicating when the application last modified the file. A third feature includes a sensitivity level of the file indicating a degree of confidentiality attached to content of the file. A fourth feature includes a retention priority indicating a duration of time for which the file is to be retained. A fifth feature includes a type of the file indicating a format of the file, e.g., text file, image file, audio file, video file, and so forth.

In a step 625A, these metadata details about the files may be collected by agents installed at the clients. The metadata details are sent by the agents to the data protection appliance for pre-processing and analysis.

In an embodiment, pre-processing includes normalization of features, feature encoding, and outlier detection. Normalization includes scaling data to standardize feature range. Normalization helps to ensure that all features (variables) are on the same scale before computing centroids. Since centroids are calculated as the mean of data points, normalization prevents variables with larger scales from dominating the distance calculations.

Feature encoding converts categorical data for model compatibility. In some cases, file features or attribute values collected by the agents may be categorical or have labels. For example, the feature retention priority may be categorized as short-term, medium-term, and long-term (or 3-year, 7-year, or 10-year, respectively). The feature file sensitivity may be categorized as high, medium, or low. These labels may indicate ordinal data and may not be normalized like numerical data. Thus, the labels may be transformed into numerical formats so that the feature can be processed in the machine learning model. For example, the label low sensitivity may be assigned an integer value of 1. The label medium sensitivity may be assigned an integer value of 2. The label high sensitivity may be assigned an integer value of 3. Similarly, the "short-term," "medium-term," and "long-term" retention categories may be assigned encoded values of 1, 2, and 3, respectively.

As another example, the feature file type may be categorized or labeled as "text," "image," or "video." These categories or labels may indicate nominal data (e.g., categories without order). One-hot encoding (OHE), or other competent encoding technique, may be used to convert such categorical values into binary columns. For example, "text" may be one-hot encoded as (1, 0, 0); "image" may be one-hot encoded as (0, 1, 0); and "video" may be one-hot encoded (0, 0, 1). Each file type is thus represented by a 3-dimensional binary vector for which centroids may be calculated.

As discussed, centroids may then be computed from the normalized data set of file features or attributes to classify the files.

In a step 625B, the pre-processed data is provided to a machine learning model for training of the model. In an embodiment, the data fed to the machine learning model includes the file features and classifications made of the files according to the centroid calculations and comparisons with normalized values. The file features of the dataset (e.g., access frequency, modification time, file sensitivity, file type, and retention) may be referred to as the independent variables and the file classification may be referred to as a target variable or dependent variable. In an embodiment, the machine learning model includes a random forest machine learning model. Training the random forest machine learning model may include building decision trees using subsets of the features, optimizing tree splits for accurate tiering, and testing the model against the historical file data.

In a step 625C, the trained model is applied to a set of files. In an embodiment, a prediction engine classifies files as being one of include or exclude. There can be a tier assignment module that then assigns files to high-performance storage tiers or archival tiers (e.g., cloud storage). In an embodiment, a majority voting mechanism finalizes tiering decisions across all trees.

In a step 625D, tiering decisions are provided to a dynamic tier management module. The dynamic tier management module provides real-time updates, cost-efficiency optimization, and performance monitoring. For example, in an embodiment, the random forest machine learning model is continually trained on an on-going basis with file metadata or features data that has been collected by the agents at the clients. An updated machine learning model may be applied to files previously classified or tiered to help ensure that those previous classifications continue to remain valid.

For example, a file may have received a first classification according to an initial version of a random forest machine learning model and placed in a first storage tier established for files having the first classification. The random forest machine learning model continues to be trained and the training may result in an updated version of the random forest machine learning model. File metadata or features data of the file may be retained and submitted to the updated version of the random forest machine learning model to check whether the first classification assigned to the file is still valid. If the updated version of the random forest machine learning model assigns the file to the first classification, the file remains in the first storage tier. If, however, the updated version of the random forest machine learning model assigns the file to a second classification, the file may be moved from the first storage tier to a second storage tier that has been established for files having the second classification.

In an embodiment, the analytical phase leverages machine learning to predict the inclusion or exclusion of files based on their features. This approach enhances the decision-making process by using historical data to build a predictive model that can generalize and apply learned patterns to new files. In an embodiment, the steps of the analytical approach include 1) feature selection, 2) random forest for tiering and exclusion, and 3) model training and prediction for tiering and exclusion.

In an embodiment, features used to train the machine learning model include 1) access frequency (e.g., number of times a file is accessed); 2) modification time (m-time) (e.g., the last modified timestamp of the file); 3) file sensitivity (e.g., a classification of the file's sensitivity level (e.g., highly sensitive, medium sensitive, low sensitivity); 4) file type (e.g., the type of file (e.g., text, image, video); and 5) retention priority (e.g., the importance of the file in terms of retention (e.g., long-term, short-term). These features help in identifying the importance of the files for backup prioritization and filtering based on relevance.

Once the features related to file access patterns, file types, modification times, file sensitivity, and retention requirements are selected, a random forest model is trained to predict whether a file should be included or excluded from the backup framework based on its suitability for tiering. This model helps to ensure efficient storage management by making decisions about the inclusion of files into higher-cost, high-performance storage tiers or exclusion to more cost-effective tiers.

In an embodiment, the random forest model for tiering and exclusion includes: 1) tree constructions; 2) random subsets; 3) majority voting; and 4) improving generalization for tiering. More particularly, during training, random forest constructs multiple decision trees, each trained on a random subset of features such as access patterns, m-time (modification times), file type, and retention requirements. These features are desirable for tiering decisions, as they determine how frequently a file is accessed and whether it is suitable for high-performance storage or for archiving. Each tree evaluates different combinations of features to predict if the file should remain in the high-performance backup tier or be moved to a more cost-efficient, lower-tier storage.

At each split in a decision tree, a random subset of features is considered. This ensures that no single feature dominates the decision-making process. For example, in tiering, some files may be selected for a higher-tier backup system based on frequent access or high sensitivity, while others, based on infrequent access or lower priority, will be excluded or archived. This randomness helps the model adapt to various access patterns and file characteristics, allowing it to make diverse and accurate tiering decisions.

Once the trees are trained, each tree independently predicts whether a file should be included in the high-performance storage tier or excluded to a lower-cost tier. The final decision is determined by majority voting, where the decision that appears most frequently across all trees is selected. For example, if the majority of trees predict that a file is suitable for exclusion to lower tiers based on its low access frequency or high modification time, then that file will be excluded, ensuring efficient storage resource allocation.

By leveraging the diversity of decision trees and random subsets of features, the random forest model improves its ability to generalize decisions regarding which files should be included or excluded from specific tiers. This reduces the risk of overfitting to particular data patterns and ensures that the model can handle a wide variety of file characteristics, from high-performance files that require rapid access to archival data that can be stored in a lower-cost tier.

The random forest model is trained using historical data where each file is labeled as "include" or "exclude" based on its relevance to the backup strategy and its suitability for tiering. The model learns to associate the input features (e.g., access frequency, modification time, file sensitivity, file type, retention priority) with the target labels (include/exclude) to predict the appropriate storage tier or exclusion from backup.

In the training phase, the model learns patterns in the data by analyzing how different features affect the decision to include a file in high-performance storage or exclude it to a lower-cost tier. For example, the model may learn that high access frequency and high file sensitivity make a file more likely to be included in a higher-tier storage, while low access frequency and lower sensitivity might push a file to exclusion or archiving.

Once trained, the model applies its learned patterns to new, unseen files. It evaluates their feature values and predicts whether a file should be included in the backup set for high-performance storage or excluded to a more cost-efficient, lower-tier storage. The inference phase ensures that the model can effectively classify new files based on the features that were impactful during training.

The following is an example calculation. Table G below shows normalized feature values for three files.

TABLE G

| File ID | Access Frequency | Modification Time (normalized) | File Sensitivity | File Type | Retention Priority |
|---------|------------------|-------------------------------|------------------|-----------|--------------------|
| File_01 | 0.2 | 0.5 | 0.7 | Text | High |
| File_02 | 0.6 | 0.8 | 0.3 | Image | Medium |
| File_03 | 1.0 | 0.4 | 0.9 | Video | Low |

Based on historical data, the model learns the relationships between these features and the target labels ("include" or "exclude") for backup decisions. For example, it may learn that high file sensitivity (0.7 for File_01 and 0.9 for File_03) strongly influences inclusion, while low retention priority (File_03) and low file sensitivity (File_02) suggest exclusion.

Once the model is trained, it predicts the inclusion or exclusion of new files based on their features.

The following includes an example for random forest classification results for tiering and exclusion. After the model is trained, the model is applied to classify new files based on their features. The model predicts whether a file should be included in high-performance backup storage or excluded to a more cost-efficient tier.

Table H below shows an example of files being labeled with one of an "include" label or "exclude" label.

TABLE H

| File ID | Predicted Inclusion/Exclusion |
|---------|-------------------------------|
| File_01 | Include |
| File_02 | Exclude |
| File_03 | Include |

In the example shown in Table H above, file_01 is predicted to be included in the high-performance backup tier due to its high file sensitivity and high retention priority, despite its lower access frequency. File_02 is predicted to be excluded from the backup system because of its low file sensitivity, medium retention priority, and higher modification time, suggesting it is less critical. File_03 is predicted to be included due to its high access frequency and high file sensitivity, which outweigh the lower retention priority and modification time, making it a priority for backup storage despite its lower retention requirement.

In an embodiment, systems and techniques include a hybrid approach combining semi-analytical centroid computing and AI-based analytical methods, leveraging machine learning for dynamic backup file tiering and exclusion, ensuring optimized storage management and decision accuracy. The disclosed systems and techniques provide improved storage efficiency by accurately classifying and tiering backup files based on their features, the solution ensures optimal storage usage, reducing unnecessary data retention and minimizing costs. In an embodiment, the hybrid approach allows for faster and more efficient backup processes by excluding irrelevant files and focusing resources on high-priority data, ensuring quicker backups and recovery.

In an embodiment, systems and techniques provide for automatic tiering that in a first step uses a centroid based calculation to pre-filter the files that are in the candidate set of files that can be tiered, and in a second step, uses a machine learning-based analytical phase to refine the file set to be tiered. In this embodiment, tiering combines centroid-based pre-filtering with machine learning-based analytical refinement for tiering decisions. Thus, rather than being dependent on static rules or basic metadata analysis, systems and techniques dynamically pre-filters data using centroids and refines decisions using a random forest model, ensuring higher accuracy and adaptability.

A lightweight agent collects features (e.g., access patterns, file sensitivity) in real-time to allow dynamic calculations of thresholds using centroid-based normalization. Rather than relying on fixed rules, the disclosed systems and techniques can adapt to changing data patterns and business needs without manual intervention, ensuring optimal tiering decisions in dynamic environments. Systems and techniques consider multiple granular features such as access frequency, file sensitivity, retention requirements, and file type for tiering decisions, rather than relying solely on simplistic criteria such as file age or size. The disclosed systems and techniques provide improved control over storage decisions while ensuring compliance, security, and efficient resource allocation. Pre-filtering non-critical data using centroid-based thresholds before applying machine learning can significantly reduce computational overhead because data is not processed indiscriminately, leading to inefficiencies.

As another example, consider that a company manages a dataset containing the following: 1) financial records (high sensitivity, high retention priority, infrequent access); 2) training videos (low sensitivity, infrequent access, large size); and 3) temporary log files (low sensitivity, no retention requirement, frequently generated). In this example, the goal is to ensure financial records remain in high-performance storage for compliance; training videos are moved to lower-cost tiers to save storage costs; and 3) temporary log files are excluded from backups to reduce overhead.

In this example, data collection includes a lightweight agent to collect granular features (e.g., access frequency, sensitivity, and retention). This helps to enable strong decision-making based on multiple features, not just size or age. A pre-filtering step uses centroid-based pre-filtering to exclude non-critical files (e.g., temporary logs) upfront. This reduces processing overhead by excluding irrelevant data early in the process. Tiering decisions may combine centroid-based thresholds with machine learning (e.g., random forest model) for refined tiering decisions. This helps to ensure that critical files (e.g., financial records) are retained in high-performance storage rather than being migrated to lower storage tiers simply because of age. A static rule specifying, for example, that files older than 90 days are to be moved to lower tiers can result in unwanted migrations of critical files to lower storage tiers. Dynamic adaptation allows for dynamically adjusting thresholds and predictions based on real-time access patterns. The system can adapt to sudden changes (e.g., audit-related access spikes), ensuring optimal tier placement. Granular feature analysis considers granular features (e.g., sensitivity, retention, access patterns) for better decisions. Non-critical files (e.g., training videos) are moved to lower-cost tiers, saving storage costs. Resource utilization is improved with pre-filtering non-critical files, minimizing unnecessary processing. This speeds up operations and reduces costs by focusing resources on critical data.

In the example above, financial records may be retained in high-performance storage due to high sensitivity and retention priority, rather than being moved to lower tiers due to infrequent access, violating compliance. The disclosed systems and techniques help to ensure compliance and business continuity. Training videos may be moved to lower-cost tiers due to low sensitivity and infrequent access, rather than being retained in high-performance storage due to large size, wasting resources. The disclosed systems and techniques can save storage costs by optimizing tier placement. Temporary log files may be excluded upfront, reducing processing overhead and storage costs. This improves efficiency by eliminating unnecessary data processing.

FIG. 7 shows another flow for storage tiering, according to one or more embodiments. The flow in FIG. 7 relies on semi-analytical techniques (and not machine learning) to make tiering decisions. As discussed, machine learning is compute-intensive and can require a customer enterprise to submit their data to a third-party data center that has the necessary storage and compute capabilities for machine learning. This may not be feasible for the customer enterprise considering the costs associated with machine learning, corporate security policies of the customer enterprise governing the transmission of data to third-parties, or both. In these scenarios, the customer enterprise may elect the option shown in FIG. 7 for tiering determinations. The flow in FIG. 7 is similar to steps 210-235 as shown in FIG. 6, but does not include the random forest machine learning component.

More particularly, in a step 710, agents are installed across a set of clients to collect features data (e.g., metadata) associated with files backed up from the clients to a data protection appliance. In a step 715, the features data is preprocessed and normalized. In a step 725, centroids are calculated for the features associated with the files. In a step 730, normalized values of the features are compared against respective centroids of the features associated with the files. In a step 735, based on the comparison, each file is classified with one of an include label or exclude label.

In an embodiment, if any normalized value of a respective feature associated with the file falls below the respective centroid calculated for the respective feature, the file is classified with the exclude label. If each normalized value of each respective feature associated with the file is equal to or greater than the respective centroid calculated for the respective feature, the file is classified with the include label.

In a step 740, the files are tiered according to the classifications. In an embodiment, files having the exclude label are moved from a current storage tier of the data protection appliance to a different storage tier, the current storage tier having higher performance characteristics than the different storage tier. Files having the include label are allowed to remain in the current storage tier.

FIG. 8 shows another flow for storage tiering, according to one or more embodiments. The flow shown in FIG. 8 collects historical file metadata and generates a training data set from the historical data for training a random forest machine learning model (step 805). The (trained) random forest machine learning model is then applied to a new set of files to classify the files.

Substeps 810-835 for collecting file metadata and generating the training data are similar to steps 710-735. More particularly, in a step 810, agents are installed across a set of clients to collect features data (e.g., metadata) associated with files backed up from the clients to a data protection appliance. In a step 815, the features data is preprocessed and normalized. In a step 825, centroids are calculated for the features associated with the files. In a step 830, normalized values of the features are compared against respective centroids of the features associated with the files. In a step 835, based on the comparison, each file is classified with one of an include label or exclude label.

In a step 840, a random forest machine learning model is trained using the historical data set and file classifications (e.g., features data associated with the files and classifications made of the files).

In a step 845, the random forest machine learning model is applied to a new set of files backed up from the clients to the data protection appliance to classify each new file with one of the include label or exclude label.

In a step 850, the new set of files are tiered according to the classification. That is, new files having the include label are allowed to remain in a high performance storage tier at the data protection appliance. New files having the exclude label are moved from the high performance storage tier to a storage tier having lower performance.

FIG. 9 shows another flow for storage tiering, according to one or more embodiments. The flow shown in FIG. 9 may be used to analyze files present at the client to determine whether they qualify for backup to the data protection appliance and, for the files that qualify for the backup, determine the storage tier at which the backed up files should reside.

The technique shown in FIG. 9 uses non-machine learning techniques to make the initial determinations of which files present at the clients should be backed up to the data protection appliance and then applies machine learning to the files that have been backed up to the data protection appliance to make tiering decisions. The technique can allow certain files, such as temporary log files present at the clients, to be immediately marked as irrelevant and not qualifying for backup to the data protection appliance. Machine learning can then be applied to the files that do qualify for backup to the data protection appliance to make decisions on how the backed up files should be tiered. The technique allows for a judicious use of the compute resources used to process machine learning models and accompanying data sets. Machine learning can be applied to a reduced file set (e.g., files qualified for backup), rather than each and every file that may be present at the clients.

In a step 905, agents are installed across a set of clients to collect features data (e.g., metadata) associated with files present at the client. As discussed, such features data includes file access patterns or frequency, modification times, file type, file sensitivity, and retention priorities. The collected file metadata or features data associated with the files present at the client is transmitted to the data protection appliance for processing. Specifically, in a step 915, the features data is preprocessed and normalized. In a step 925, centroids are calculated for the features associated with the files. In a step 930, a determination is made as to whether any normalized value of a respective feature associated with a file present at a client falls below a respective centroid calculated for the respective feature.

If so, the file present at the client is not backed up to the data protection appliance (step 940). In other words, the backup of the file is bypassed, withheld, or suppressed.

If, however, each normalized value of each respective feature associated with the file present at the client is equal to or above (e.g., greater) than the respective centroid calculated for the respective feature, the file is backed up from the client to the data protection appliance (step 950).

In a step 955, a random forest machine learning model is applied to the files that have been backed up to the data protection appliance to tier the backed up files. That is, some files that have been backed up may be allowed to remain in a high performance storage tier offered by the data protection appliance, while other files that have been backed up may be moved from the a higher performance storage tier of the data protection appliance to a lower performing storage tier such as cloud storage.

The technique shown in FIG. 9 uses a centroid-based threshold calculations to exclude certain files present at the client from backup and then uses machine learning on the files that have been backed up to refine decisions on tiering.

In an embodiment, a method includes: installing a plurality of agents across a plurality of clients to collect metadata about files present at the clients, the file metadata for each file comprising a plurality of features, the plurality of features comprising an access frequency, a modification time, a sensitivity level, a retention priority, and a file type; receiving the file metadata, including values for the plurality of features, at a data protection appliance coupled to the clients; normalizing the values of the plurality of features, the normalized features for each file thereby comprising a normalized access frequency, a normalized modification time, a normalized sensitivity level, a normalized retention priority, and a normalized file type; calculating, using the normalized values, a centroid for each of the plurality of features associated with the files, the files being present at the clients; for each file, comparing a normalized value of a feature associated with a file against a respective centroid calculated for the feature; based on the comparison, if any normalized value of a respective feature associated with the file falls below the respective centroid calculated for the respective feature, not backing up the file from a client at which the file is present; if each normalized value of each respective feature associated with the file is equal to or above the respective centroid calculated for the respective feature, backing up the file to the data protection appliance; and applying a random forest machine learning model to files that have been backed up to the data protection appliance to tier the backed up files.

In an embodiment, a method includes: collecting values for a plurality of features associated with each file of a plurality of files, the plurality of features comprising an access frequency, a modification time, a sensitivity level, a retention priority, and a file type; normalizing the values; calculating, using the normalized values, centroids for the plurality of features for each file; for each file, comparing a normalized value of a feature associated with a file against a respective centroid calculated for the feature; based on the comparison, if any normalized value of a respective feature associated with the file falls below the respective centroid calculated for the respective feature, moving the file from a current storage tier having high performance characteristics to a different storage tier having performance characteristics lower than the current storage tier; and if each normalized value of each respective feature associated with the file is equal to or above the respective centroid calculated for the respective feature, allowing the file to remain in the current storage tier having the high performance characteristics.

In an embodiment, a method includes: installing a plurality of agents across a plurality of clients to collect values for a plurality of features associated with files backed up from the clients to a data protection appliance, the features comprising access frequencies, modification times, sensitivity levels, retention priorities, and file types; classifying each file as being one of included or excluded based on the collected values for the features, a file classified as included being allowed to remain in a high performance storage tier at the data protection appliance, and a file classified as excluded being moved from the high performance storage tier to a lower performance storage tier at a cloud storage provider; training a random forest machine learning model using the collected values for the features associated with the files and classifications of the files; and classifying, using the random forest machine learning model, a new set of files backed up to the data protection appliance based on new values collected for the features and associated with the new files.

In an embodiment, a method includes: collecting values for a plurality of features associated with files backed up from a plurality of clients to a data protection appliance, the features comprising access frequencies, modification times, sensitivity levels, retention priorities, and file types; normalizing the values; calculating, using the normalized values, centroids for the plurality of features for each file; comparing the normalized values of the features associated with the files against respective centroids calculated for the features; classifying, based on the comparison, each file as being one of excluded or included; training a random forest machine learning model using the normalized values for the features associated with the files and the classifications made of the files; and classifying, based on the random forest machine learning model, a new set of files backed up from the clients to the data protection appliance as being one of excluded or included, wherein files classified as included remain in a storage tier of the data protection appliance and files classified as excluded are moved from the storage tier of the data protection appliance to a different storage tier of a cloud storage provider, the different storage tier having performance characteristics lower than the storage tier of the data protection appliance.

In an embodiment, a method includes: collecting values for a plurality of features associated with each file of a plurality of files, the plurality of features comprising an access frequency, a modification time, a sensitivity level, a retention priority, and a file type; normalizing the values; calculating, using the normalized values, centroids for the plurality of features for each file; for each file, comparing a normalized value of a feature associated with a file against a respective centroid calculated for the feature; based on the comparison, if any normalized value of a respective feature associated with the file falls below the respective centroid calculated for the respective feature, moving the file from a current storage tier having high performance characteristics to a different storage tier having performance characteristics lower than the current storage tier; and if each normalized value of each respective feature associated with the file is equal to or above the respective centroid calculated for the respective feature, allowing the file to remain in the current storage tier having the high performance characteristics.

In an embodiment, the access frequency associated with the file indicates a number of times the file is accessed over a period of time, the modification time associated with the file indicates a time the file was last modified, the sensitivity level associated with the file indicates a degree of confidentiality attached to content of the file, the retention priority associated with the file indicates a duration of time for which the file is to be retained, and the file type associated with the file indicates a format of the file.

Normalizing the values may include applying a Min-Max normalization. Normalizing the values may include converting categorical data of the plurality of features into numerical values. The method may include installing agents across a plurality of clients to collect the values for the plurality of features associated with the plurality of files, the plurality of files being present across the plurality of clients. In an embodiment, the current storage tier is at a data protection appliance and the different storage tier is at a cloud storage provider, remote from the data protection appliance.

In an embodiment, a method includes: installing a plurality of agents across a plurality of clients to collect values for a plurality of features associated with files backed up from the clients to a data protection appliance, the features comprising access frequencies, modification times, sensitivity levels, retention priorities, and file types; classifying each file as being one of included or excluded based on the collected values for the features, a file classified as included being allowed to remain in a high performance storage tier at the data protection appliance, and a file classified as excluded being moved from the high performance storage tier to a lower performance storage tier at a cloud storage provider; training a machine learning model using the collected values for the features associated with the files and classifications of the files; and classifying, using the machine learning model, a new set of files backed up to the data protection appliance based on new values collected for the features and associated with the new files.

In an embodiment, the machine learning model comprises a random forest machine learning model. In an embodiment, an access frequency associated with a file indicates a number of times the file is accessed over a period of time, a modification time associated with the file indicates a time the file was last modified, a sensitivity level associated with the file indicates a degree of confidentiality attached to content of the file, a retention priority associated with the file indicates a duration of time for which the file is to be retained, and a file type associated with the file indicates a format of the file.

In an embodiment, the classifying each file as being one of included or excluded comprises: normalizing the collected values for the plurality of features; calculating, using the normalized values, centroids for the plurality of features associated with each file; for each file, comparing a normalized of a feature associated with a file against a respective centroid calculated for the feature; and based on the comparison, performing one of moving the file from the data protection appliance to the cloud storage provider or allowing the file to remain at the data protection appliance.

The method may include after the classifying, using the machine learning model, the new set of files, moving a new file classified as excluded from the data protection appliance to the cloud storage provider.

The method may include after the classifying, using the machine learning model, the new set of files, allowing a new file classified as included to remain at the data protection appliance.

In an embodiment, a method includes: collecting metadata about files present at a plurality of clients, the file metadata for each file comprising a plurality of features; receiving the file metadata, including values for the plurality of features, at a data protection appliance coupled to the clients; normalizing the values of the plurality of features; calculating, using the normalized values, a centroid for each of the plurality of features associated with the files; for each file, comparing a normalized value of a feature associated with a file against a respective centroid calculated for the feature; based on the comparison, if any normalized value of a respective feature associated with the file falls below the respective centroid calculated for the respective feature, not backing up the file from a client at which the file is present; if each normalized value of each respective feature associated with the file is equal to or above the respective centroid calculated for the respective feature, backing up the file to the data protection appliance; and applying a machine learning model to files that have been backed up to the data protection appliance to tier the backed up files.

In an embodiment, the plurality of features comprises an access frequency, a modification time, a sensitivity level, a retention priority, and a file type. In an embodiment, the access frequency indicates a number of times the file has been accessed over a period of time, the modification time indicates a time when the file was last modified, the sensitivity level indicates a degree of confidentiality that has been attached to content of the file, the retention priority indicates a duration of time for which the file is to be retained, and the file type indicates a format of the file.

In an embodiment, the method includes: training the machine learning model using the file metadata collected at the plurality of clients and classifications of the files, the classifications comprising one of a first or second label attached to each file, wherein the first label attached to a particular file indicates that the particular file is allowed to remain at the data protection appliance, and wherein the second label attached to the particular file indicates that the particular file is to be moved from the data protection appliance to cloud storage.

In an embodiment, tiering the files backed up to the data protection appliance comprises allowing some files to remain at the data protection appliance and moving other files from the data protection appliance to cloud storage. In an embodiment, the machine learning model comprises a random forest machine learning model.

In an embodiment, there is a system comprising: a processor; and memory configured to store one or more sequences of instructions which, when executed by the processor, cause the processor to carry out the steps of: collecting metadata about files present at a plurality of clients, the file metadata for each file comprising a plurality of features; receiving the file metadata, including values for the plurality of features, at a data protection appliance coupled to the clients; normalizing the values of the plurality of features; calculating, using the normalized values, a centroid for each of the plurality of features associated with the files; for each file, comparing a normalized value of a feature associated with a file against a respective centroid calculated for the feature; based on the comparison, if any normalized value of a respective feature associated with the file falls below the respective centroid calculated for the respective feature, not backing up the file from a client at which the file is present; if each normalized value of each respective feature associated with the file is equal to or above the respective centroid calculated for the respective feature, backing up the file to the data protection appliance; and applying a machine learning model to files that have been backed up to the data protection appliance to tier the backed up files.

In an embodiment, there is a computer program product, comprising a non-transitory computer-readable medium having a computer-readable program code embodied therein, the computer-readable program code adapted to be executed by one or more processors to implement a method comprising: collecting metadata about files present at a plurality of clients, the file metadata for each file comprising a plurality of features; receiving the file metadata, including values for the plurality of features, at a data protection appliance coupled to the clients; normalizing the values of the plurality of features; calculating, using the normalized values, a centroid for each of the plurality of features associated with the files; for each file, comparing a normalized value of a feature associated with a file against a respective centroid calculated for the feature; based on the comparison, if any normalized value of a respective feature associated with the file falls below the respective centroid calculated for the respective feature, not backing up the file from a client at which the file is present; if each normalized value of each respective feature associated with the file is equal to or above the respective centroid calculated for the respective feature, backing up the file to the data protection appliance; and applying a machine learning model to files that have been backed up to the data protection appliance to tier the backed up files.

In an embodiment, there is a system comprising: a processor; and memory configured to store one or more sequences of instructions which, when executed by the processor, cause the processor to carry out the steps of: collecting values for a plurality of features associated with each file of a plurality of files, the plurality of features comprising an access frequency, a modification time, a sensitivity level, a retention priority, and a file type; normalizing the values; calculating, using the normalized values, centroids for the plurality of features for each file; for each file, comparing a normalized value of a feature associated with a file against a respective centroid calculated for the feature; based on the comparison, if any normalized value of a respective feature associated with the file falls below the respective centroid calculated for the respective feature, moving the file from a current storage tier having high performance characteristics to a different storage tier having performance characteristics lower than the current storage tier; and if each normalized value of each respective feature associated with the file is equal to or above the respective centroid calculated for the respective feature, allowing the file to remain in the current storage tier having the high performance characteristics.

In an embodiment, there is a computer program product, comprising a non-transitory computer-readable medium having a computer-readable program code embodied therein, the computer-readable program code adapted to be executed by one or more processors to implement a method comprising: collecting values for a plurality of features associated with each file of a plurality of files, the plurality of features comprising an access frequency, a modification time, a sensitivity level, a retention priority, and a file type; normalizing the values; calculating, using the normalized values, centroids for the plurality of features for each file; for each file, comparing a normalized value of a feature associated with a file against a respective centroid calculated for the feature; based on the comparison, if any normalized value of a respective feature associated with the file falls below the respective centroid calculated for the respective feature, moving the file from a current storage tier having high performance characteristics to a different storage tier having performance characteristics lower than the current storage tier; and if each normalized value of each respective feature associated with the file is equal to or above the respective centroid calculated for the respective feature, allowing the file to remain in the current storage tier having the high performance characteristics.

In an embodiment, there is a system comprising: a processor; and memory configured to store one or more sequences of instructions which, when executed by the processor, cause the processor to carry out the steps of: installing a plurality of agents across a plurality of clients to collect values for a plurality of features associated with files backed up from the clients to a data protection appliance, the features comprising access frequencies, modification times, sensitivity levels, retention priorities, and file types; classifying each file as being one of included or excluded based on the collected values for the features, a file classified as included being allowed to remain in a high performance storage tier at the data protection appliance, and a file classified as excluded being moved from the high performance storage tier to a lower performance storage tier at a cloud storage provider; training a machine learning model using the collected values for the features associated with the files and classifications of the files; and classifying, using the machine learning model, a new set of files backed up to the data protection appliance based on new values collected for the features and associated with the new files.

In an embodiment, there is a computer program product, comprising a non-transitory computer-readable medium having a computer-readable program code embodied therein, the computer-readable program code adapted to be executed by one or more processors to implement a method comprising: installing a plurality of agents across a plurality of clients to collect values for a plurality of features associated with files backed up from the clients to a data protection appliance, the features comprising access frequencies, modification times, sensitivity levels, retention priorities, and file types; classifying each file as being one of included or excluded based on the collected values for the features, a file classified as included being allowed to remain in a high performance storage tier at the data protection appliance, and a file classified as excluded being moved from the high performance storage tier to a lower performance storage tier at a cloud storage provider; training a machine learning model using the collected values for the features associated with the files and classifications of the files; and classifying, using the machine learning model, a new set of files backed up to the data protection appliance based on new values collected for the features and associated with the new files.

Figure 10:
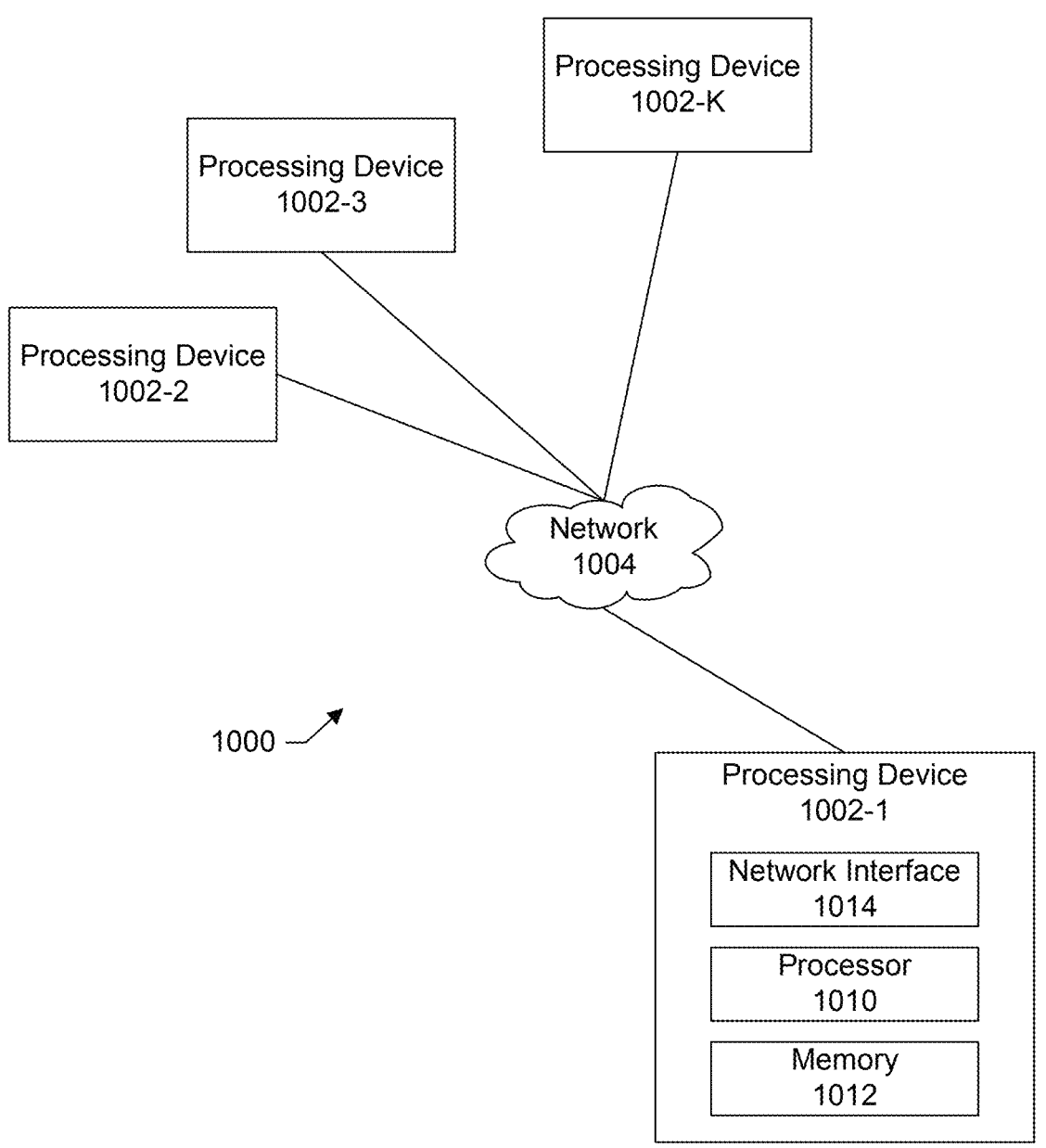
FIG. 10 shows another block diagram of a processing platform that may be utilized to implement at least a portion of an information processing system, according to one or more embodiments.

FIG. 10 shows an example of a processing platform 1000. The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The network may itself be comprised of many interconnected computer systems and communication links. Communication links may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, the network is the Internet, in other embodiments, the network may be any suitable communication network including a local area network (LAN), a wide area network (WAN), a wireless network, an intranet, a private network, a public network, a switched network, and combinations of these, and the like.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Processing devices may be referred to as clients. The clients may be any type of computing device. Examples of computing devices include personal computers (e.g., desktops, laptops, tablets, smartphones, mobile phones, smartwatches, or wearable devices), servers, Web-enabled devices, or Internet of Things (IoT) devices and appliances. The clients generate data, files, or other data objects that may be referred to as primary data.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 1000 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LX Cs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 11:
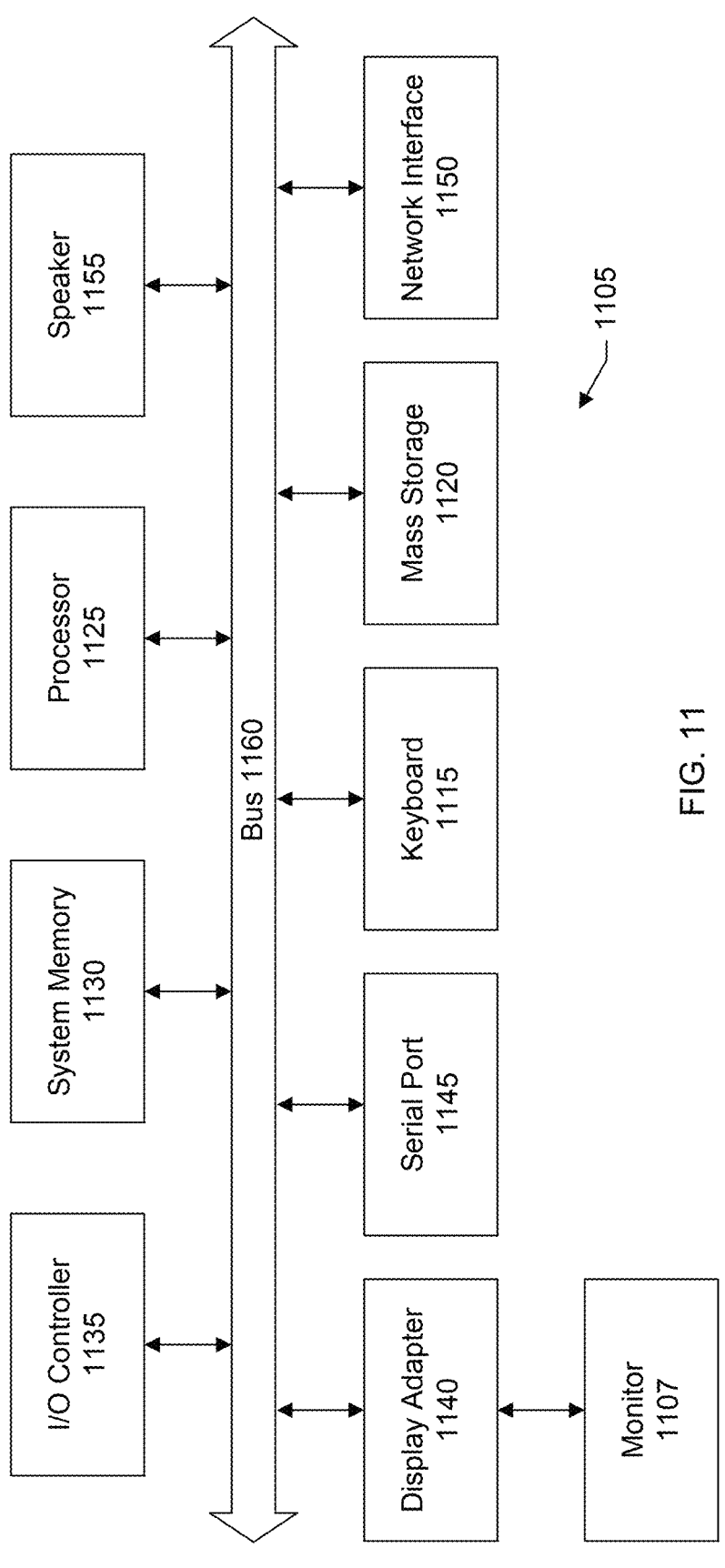
FIG. 11 shows a block diagram of a computer system suitable for use with the information processing system, according to one or more embodiments.

FIG. 11 shows a system block diagram of a computer system 1105 used to execute the software of the present system described herein. The computer system includes a monitor 1107, keyboard 1115, and mass storage devices 1120. Computer system 1105 further includes subsystems such as central processor 1125, system memory 1130, input/output (I/O) controller 1135, display adapter 1140, serial or universal serial bus (USB) port 1145, network interface 1150, and speaker 1155. The system may also be used with computer systems with additional or fewer subsystems. For example, a computer system could include more than one processor 1125 (i.e., a multiprocessor system) or a system may include a cache memory.

Arrows such as 1160 represent the system bus architecture of computer system 1105. However, these arrows are illustrative of any interconnection scheme serving to link the subsystems. For example, speaker 1155 could be connected to the other subsystems through a port or have an internal direct connection to central processor 1125. The processor may include multiple processors or a multicore processor, which may permit parallel processing of information. Computer system 1105 shown in FIG. 11 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

What is claimed is:

1. A method comprising: collecting metadata about files present at a plurality of clients, the file metadata for each file comprising a plurality of features;
  receiving the file metadata, including values for the plurality of features, at a data protection appliance coupled to the clients;
  normalizing the values of the plurality of features, wherein the plurality of features comprises an access frequency, a modification time, a sensitivity level, a retention priority, and a file type;
  wherein the access frequency indicates a number of times the file has been accessed over a period of time, the modification time indicates a time when the file was last modified, the sensitivity level indicates a degree of confidentiality that has been attached to content of the file, the retention priority indicates a duration of time for which the file is to be retained, and the file type indicates a format of the file;
  calculating, using the normalized values, a centroid for each of the plurality of features associated with the files;
  for each file, comparing a normalized value of a feature associated with a file against a respective centroid calculated for the feature;
  based on the comparison, when any normalized value of a respective feature associated with the file falls below the respective centroid calculated for the respective feature, not backing up the file from a client at which the file is present;
  when each normalized value of each respective feature associated with the file is equal to or above the respective centroid calculated for the respective feature, backing up the file to the data protection appliance; and
  applying a machine learning model to files that have been backed up to the data protection appliance to tier the backed up files.

2. The method of claim 1 further comprising:
  training the machine learning model using the file metadata collected at the plurality of clients and classifications of the files, the classifications comprising one of a first or second label attached to each file, wherein the first label attached to a particular file indicates that the particular file is allowed to remain at the data protection appliance, and
  wherein the second label attached to the particular file indicates that the particular file is to be moved from the data protection appliance to cloud storage.

3. The method of claim 1 wherein tiering the files backed up to the data protection appliance comprises allowing some files to remain at the data protection appliance and moving other files from the data protection appliance to cloud storage.

4. The method of claim 1 wherein the machine learning model comprises a random forest machine learning model.

5. A system comprising: a processor; and memory configured to store one or more sequences of instructions which, when executed by the processor, cause the processor to carry out the steps of:
  collecting metadata about files present at a plurality of clients, the file metadata for each file comprising a plurality of features;
  receiving the file metadata, including values for the plurality of features, at a data protection appliance coupled to the clients;
  normalizing the values of the plurality of features, wherein the plurality of features comprises an access frequency, a modification time, a sensitivity level, a retention priority, and a file type;
  wherein the access frequency indicates a number of times the file has been accessed over a period of time, the modification time indicates a time when the file was last modified, the sensitivity level indicates a degree of confidentiality that has been attached to content of the file, the retention priority indicates a duration of time for which the file is to be retained, and the file type indicates a format of the file;
  calculating, using the normalized values, a centroid for each of the plurality of features associated with the files;
  for each file, comparing a normalized value of a feature associated with a file against a respective centroid calculated for the feature;
  based on the comparison, when any normalized value of a respective feature associated with the file falls below the respective centroid calculated for the respective feature, not backing up the file from a client at which the file is present;
  when each normalized value of each respective feature associated with the file is equal to or above the respective centroid calculated for the respective feature, backing up the file to the data protection appliance; and
  applying a machine learning model to files that have been backed up to the data protection appliance to tier the backed up files.

6. The system of claim 5 wherein the processor further carries out the steps of:
  training the machine learning model using the file metadata collected at the plurality of clients and classifications of the files, the classifications comprising one of a first or second label attached to each file, wherein the first label attached to a particular file indicates that the particular file is allowed to remain at the data protection appliance, and
  wherein the second label attached to the particular file indicates that the particular file is to be moved from the data protection appliance to cloud storage.

7. The system of claim 5 wherein tiering the files backed up to the data protection appliance comprises allowing some files to remain at the data protection appliance and moving other files from the data protection appliance to cloud storage.

8. The system of claim 5 wherein the machine learning model comprises a random forest machine learning model.

9. A computer program product, comprising a non-transitory computer-readable medium having a computer-readable program code embodied therein, the computer-readable program code adapted to be executed by one or more processors to implement a method comprising: collecting metadata about files present at a plurality of clients, the file metadata for each file comprising a plurality of features;

receiving the file metadata, including values for the plurality of features, at a data protection appliance coupled to the clients;

normalizing the values of the plurality of features, wherein the plurality of features comprises an access frequency, a modification time, a sensitivity level, a retention priority, and a file type;

wherein the access frequency indicates a number of times the file has been accessed over a period of time, the modification time indicates a time when the file was last modified, the sensitivity level indicates a degree of confidentiality that has been attached to content of the file, the retention priority indicates a duration of time for which the file is to be retained, and the file type indicates a format of the file;

calculating, using the normalized values, a centroid for each of the plurality of features associated with the files;

for each file, comparing a normalized value of a feature associated with a file against a respective centroid calculated for the feature;

based on the comparison, when any normalized value of a respective feature associated with the file falls below the respective centroid calculated for the respective feature, not backing up the file from a client at which the file is present;

when each normalized value of each respective feature associated with the file is equal to or above the respective centroid calculated for the respective feature, backing up the file to the data protection appliance; and applying a machine learning model to files that have been backed up to the data protection appliance to tier the backed up files.

10. The computer program product of claim 9 wherein the method further comprises:

training the machine learning model using the file metadata collected at the plurality of clients and classifications of the files, the classifications comprising one of a first or second label attached to each file, wherein the first label attached to a particular file indicates that the particular file is allowed to remain at the data protection appliance, and wherein the second label attached to the particular file indicates that the particular file is to be moved from the data protection appliance to cloud storage.

11. The computer program product of claim 9 wherein tiering the files backed up to the data protection appliance comprises allowing some files to remain at the data protection appliance and moving other files from the data protection appliance to cloud storage.

12. The computer program product of claim 9 wherein the machine learning model comprises a random forest machine learning model.

* * * * *